Dec. 29, 1959 W. S. ROHLAND 2,919,426
CHARACTER READER
Original Filed Dec. 24, 1954 16 Sheets-Sheet 1

INVENTOR.
WILLIAM S. ROHLAND
BY
Dewey J. Cunningham
ATTORNEY

*INVENTOR.*
WILLIAM S. ROHLAND
*BY*
Dewey J. Cunningham
ATTORNEY

*INVENTOR.*
WILLIAM S. ROHLAND
*BY*
Dewey J. Cunningham
ATTORNEY

RASTER ROTATION POSITION

| CHARACTER | HORIZONTAL COUNT | RELAY 1 | 2 | 3 | 4 | 5 | 6 | 55° DIAGONAL COUNT | RELAY 7 | 8 | 9 | 10 | 11 | 12 |
|---|---|---|---|---|---|---|---|---|---|---|---|---|---|---|
| A | 8 | X | | | X | | | 5 | | | | X | | |
| B | 8-8-8 | X | X | X | X | X | X | 5 | | | | X | | |
| C | 6-6 | | | | X | X | | 5 | | | | X | | |
| D | 8-8 | X | X | | X | X | | 5 | | | | X | | |
| E | 9-5-9 | X | X | | | | X | 5 | | | | X | | |
| F | 9-6 | X | | | X | X | | 5 | | | | X | | |
| G | 6-6-6 | | | | X | X | X | 5-5 | | | | X | X | |
| H | 10 | X | | | X | | | 5 | | | | X | | |
| I | 3 | | | | | | | 3 | | | | | | |
| J | 7 | | | | X | | | 5 | | | | X | | |
| K | 6 | | | | X | | | 8 | X | | | X | | |
| L | 9 | X | | | X | | | 2 | | | | | | |
| M | 5-6-6 | | | | X | X | X | 6 | | | | X | | |
| N | 5-5 | | | | X | X | | 5 | | | | X | | |
| O | 6-6 | | | | X | X | | 5-5 | | | | X | X | |
| P | 8-9 | X | X | | X | X | | 5 | | | | X | | |
| Q | 6-6-6 | | | | X | X | X | 5-5 | | | | X | X | |
| R | 8-9 | X | X | | X | X | | 5 | | | | X | | |
| S | 7-7-7 | | | | X | X | X | 6-6 | | | | X | X | |
| T | 10 | X | | | X | | | 4 | | | | | | |
| U | 7 | | | | X | | | 4 | | | | | | |
| V | 4 | | | | | | | 5 | | | | X | | |
| W | 5-5-5 | | | | X | X | X | 6 | | | | X | | |
| X | 5-5-5 | | | | X | X | X | 10 | | | | X | | |
| Y | 4 | | | | | | | 6 | | | | X | | |
| Z | 8-9 | X | | | X | X | | 7 | | | | X | | |

| CHARACTER | 71 DIAGONAL COUNT | RELAY 13 | 14 | 15 | 16 | 17 | 18 | VERTICAL COUNT | RELAY 19 | 20 | 21 | 22 | 23 | 24 |
|---|---|---|---|---|---|---|---|---|---|---|---|---|---|---|
| A | 10 | X | | | X | | | 5 | | | | X | | |
| B | 5 | | | | X | | | 10-7 | X | | | X | X | |
| C | 6 | | | | X | | | 7 | | | | X | | |
| D | 5 | | | | X | | | 10-5 | X | | | X | X | |
| E | 5 | | | | X | | | 10 | X | | | X | | |
| F | 5 | | | | X | | | 11 | X | | | X | | |
| G | 5-5 | | | | X | X | | 7-5 | | | | X | X | |
| H | 4-4 | | | | | | | 10-10 | X | X | | X | X | |
| I | 4 | | | | | | | 10 | X | | | X | | |
| J | 6 | | | | X | | | 10-4 | X | | | X | | |
| K | 6 | | | | X | | | 10-5 | X | | | X | X | |
| L | 3 | | | | | | | 10 | X | | | X | | |
| M | 8-5 | X | | | X | | | 10-10 | X | X | | X | X | |
| N | 5-5 | | | | X | X | | 10-10 | X | X | | X | X | |
| O | 5-5 | | | | X | X | | 6-6 | | | | X | X | |
| P | 5 | | | | X | | | 10 | X | | | X | | |
| Q | 5-5 | | | | X | X | | 6-9 | X | | | X | X | |
| R | 5-5 | | | | X | X | | 10-7 | X | | | X | X | |
| S | 6-6 | | | | X | X | | 6-7 | | | | X | X | |
| T | 5-5 | | | | X | X | | 10 | X | | | X | | |
| U | 5 | | | | X | | | 9-9 | X | X | | X | X | |
| V | 10 | X | | | X | | | 3 | | | | | | |
| W | 8-6 | X | | | X | X | | 6-5 | | | | X | X | |
| X | 6 | | | | X | | | 5-5-5 | | | | X | X | X |
| Y | 6 | | | | X | | | 6 | | | | X | | |
| Z | 9 | X | | | X | | | 5-7-5 | | | | X | X | X |

| CHARACTER | 71 CTR DIAGONAL COUNT | RELAY 25 | 26 | 27 | 28 | 29 | 30 | 55 CTR DIAGONAL COUNT | RELAY 31 | 32 | 33 | 34 | 35 | 36 |
|---|---|---|---|---|---|---|---|---|---|---|---|---|---|---|
| A | 10 | X | | | X | | | 5 | | | | X | | |
| B | 6 | | | | X | | | 5 | | | | X | | |
| C | 6 | | | | X | | | 5 | | | | X | | |
| D | 5 | | | | X | | | 5 | | | | X | | |
| E | 5 | | | | X | | | 5 | | | | X | | |
| F | 4 | | | | | | | 4 | | | | | | |
| G | 6-6 | | | | X | X | | 5-5 | | | | X | X | |
| H | 4-4 | | | | | | | 5 | | | | X | | |
| I | 4 | | | | | | | 3 | | | | | | |
| J | 4 | | | | | | | 5 | | | | X | | |
| K | 6 | | | | X | | | 9 | X | | | X | | |
| L | 5 | | | | X | | | 4 | | | | | | |
| M | 8-5 | X | | | X | X | | 6 | | | | X | | |
| N | 4 | | | | | | | 10 | X | | | X | | |
| O | 5-5 | | | | X | X | | 5-5 | | | | X | X | |
| P | 4 | | | | | | | 4 | | | | | | |
| Q | 6-5-5 | | | | | | X | 5-7-5 | | | | X | X | X |
| R | 7 | | | | X | | | 7 | | | | X | | |
| S | 5-5 | | | | X | X | | 5 | | | | X | | |
| T | 5-5 | | | | X | X | | 4 | | | | | | |
| U | 5 | | | | X | | | 4 | | | | | | |
| V | 10 | | X | | X | | | 5 | | | | X | | |
| W | 8-6 | | X | | X | X | | 6 | | | | X | | |
| X | 6 | | | | X | | | 10 | X | | | X | | |
| Y | 6 | | | | X | | | 6 | | | | X | | |
| Z | 5-5 | | | | X | X | | 4-4 | | | | | | |

FIG_8

INVENTOR.
WILLIAM S. ROHLAND
BY
Dewey J. Cunningham
ATTORNEY

INVENTOR.
WILLIAM S. ROHLAND

BY Dewey J. Cunningham

ATTORNEY

INVENTOR.
WILLIAM S. ROHLAND
BY
Dewey J. Cunningham
ATTORNEY

Dec. 29, 1959 W. S. ROHLAND 2,919,426

CHARACTER READER

Original Filed Dec. 24, 1954 16 Sheets-Sheet 7

INVENTOR.
WILLIAM S. ROHLAND

BY Dewey J. Cunningham
ATTORNEY

INVENTOR.
WILLIAM S. ROHLAND
BY
Dewey J. Cunningham
ATTORNEY

INVENTOR.
WILLIAM S. ROHLAND
BY
Dewey J. Cunningham
ATTORNEY

| THESE POINTS ARE POSITIVE FOR THE FOLLOWING SCANNING POSITIONS | D | E | F | G | H |
|---|---|---|---|---|---|
| HORIZONTAL | X | X | | | |
| DIAGONAL 1 | | | | | X |
| DIAGONAL 2 | X | | | | X |
| VERTICAL | | | X | | X |
| COUNTER-DIAG. 1 | X | | | X | |
| COUNTER-DIAG. 2 | | | | X | |
| IDLE (HOR) | X | X | | | |

*INVENTOR.*
WILLIAM S. ROHLAND
*BY*
Dewey J. Cunningham
ATTORNEY

INVENTOR.
WILLIAM S. ROHLAND
BY
Dewey J. Cunningham
ATTORNEY

Dec. 29, 1959 W. S. ROHLAND 2,919,426

CHARACTER READER

Original Filed Dec. 24, 1954 16 Sheets-Sheet 12

INVENTOR.
WILLIAM S. ROHLAND

BY

Dewey J. Cunningham
ATTORNEY

Dec. 29, 1959 W. S. ROHLAND 2,919,426

CHARACTER READER

Original Filed Dec. 24, 1954 16 Sheets-Sheet 13

INVENTOR.
WILLIAM S. ROHLAND

BY

Dewey J. Cunningham
ATTORNEY

Dec. 29, 1959 W. S. ROHLAND 2,919,426

CHARACTER READER

Original Filed Dec. 24, 1954 16 Sheets-Sheet 14

*INVENTOR.*
WILLIAM S. ROHLAND

*BY*

Dewey J. Cunningham
ATTORNEY

Dec. 29, 1959 W. S. ROHLAND 2,919,426

CHARACTER READER

Original Filed Dec. 24, 1954 16 Sheets-Sheet 15

INVENTOR.
WILLIAM S. ROHLAND

BY Dewey J. Cunningham
ATTORNEY

INVENTOR.
WILLIAM S. ROHLAND
BY Dewey J. Cunningham
ATTORNEY 2,919,426

CHARACTER READER

William S. Rohland, Endicott, N.Y., assignor to International Business Machines Corporation, New York, N.Y., a corporation of New York Continuation of application Serial No. 477,569, December 24, 1954. This application March 12, 1958, Serial No. 721,064

16 Claims. (Cl. 340—149)

The present invention relates to reading apparatus and particularly to reading apparatus which is adapted to read graphic data, and is a continuation of an application for Letters Patent of the United States Serial No. 477,569, filed on December 24, 1954, on behalf of William S. Rohland, for Character Reader.

An object of the invention is to provide improved reading apparatus.

Another object of this invention is to furnish improved reading apparatus for identifying items to be read.

Another object of the invention is to provide improved means for scanning items to be identified with a plurality of different scanning patterns and providing signals which, when combined, provide an identification of the item scanned.

Another object of the invention is to furnish improved means for reading graphic data such as alpha-numeric characters wherein the size of the characters may vary from one to the other.

Still another object of the instant invention is to provide improved means for determining when an item to be scanned is in registration with the scanning station.

A further object of the invention is to furnish improved means for scanning an item to be identified.

Still further, an object of the present invention is to provide improved means for automatically varying the size of the scanning pattern in accordance with the size of the item to be identified.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 8 shows the information obtained by the scanning patterns of Figs. 2 through 7, when scanning characters of a particular type font, and the number and kind of shape counts obtained during each of the patterns for said characters;

Figure 10A:
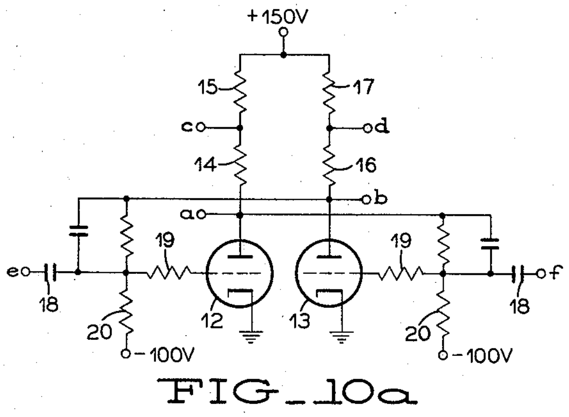
Figure 10B:
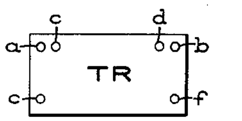
Figure 11A:
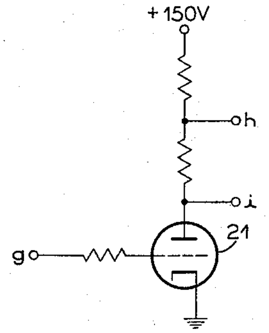
Figure 11B:
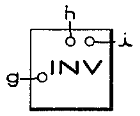
Figure 12A:
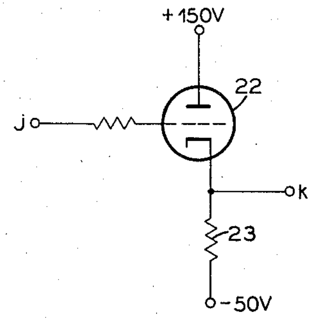
Figure 12B:
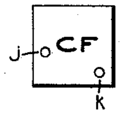
Figure 13A:
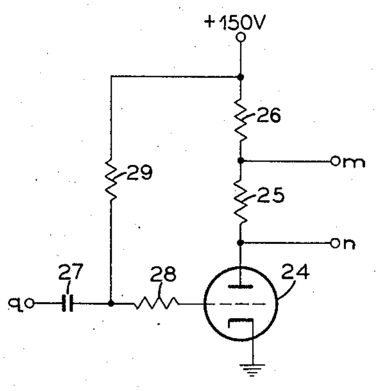
Figure 13B:
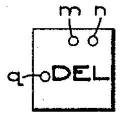
Figure 14A:
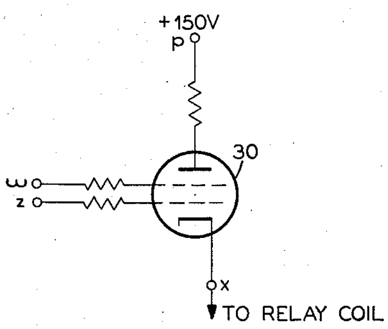
Figure 14B:
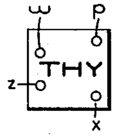
Figure 15A:
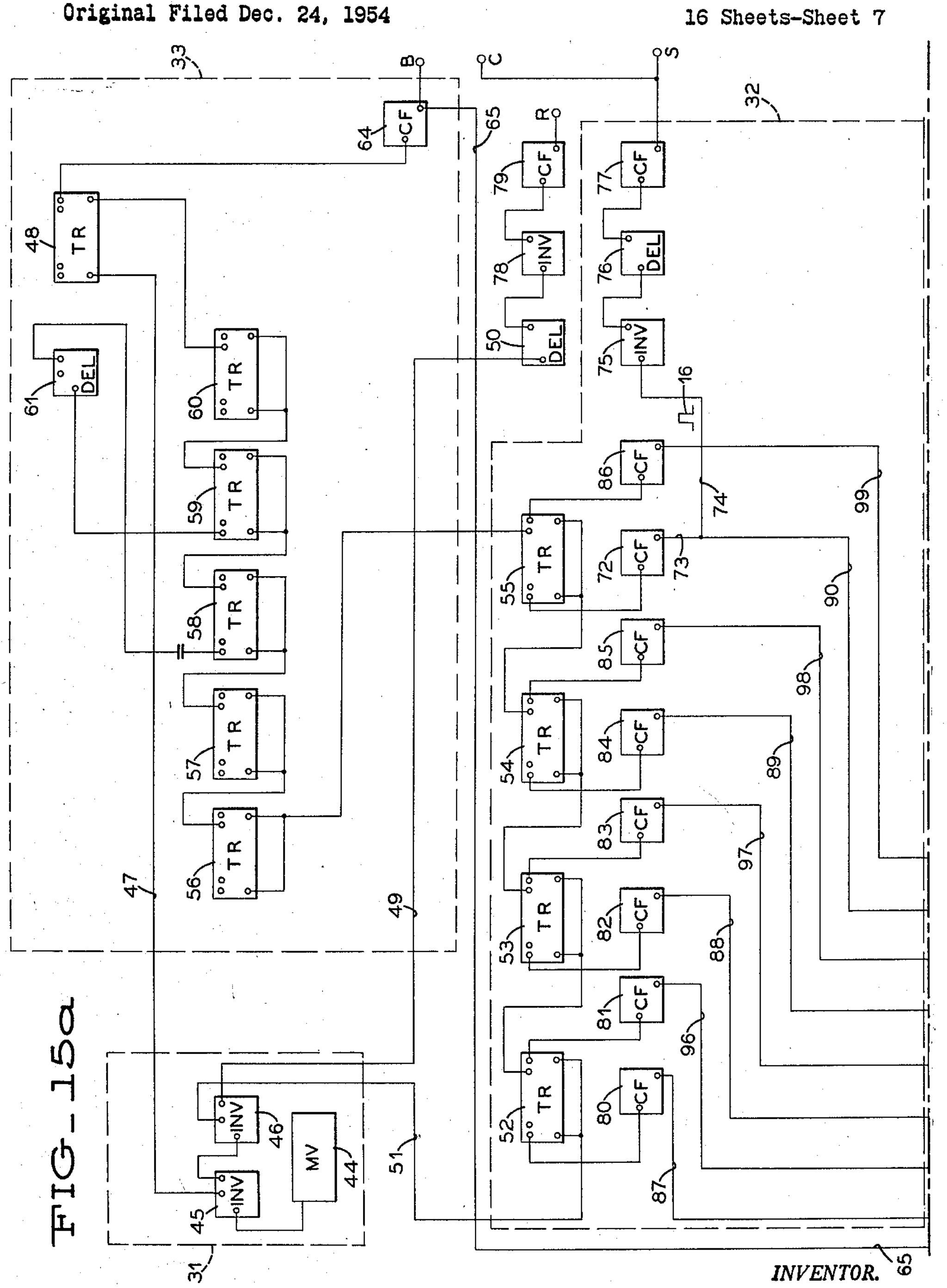
Figure 15B:
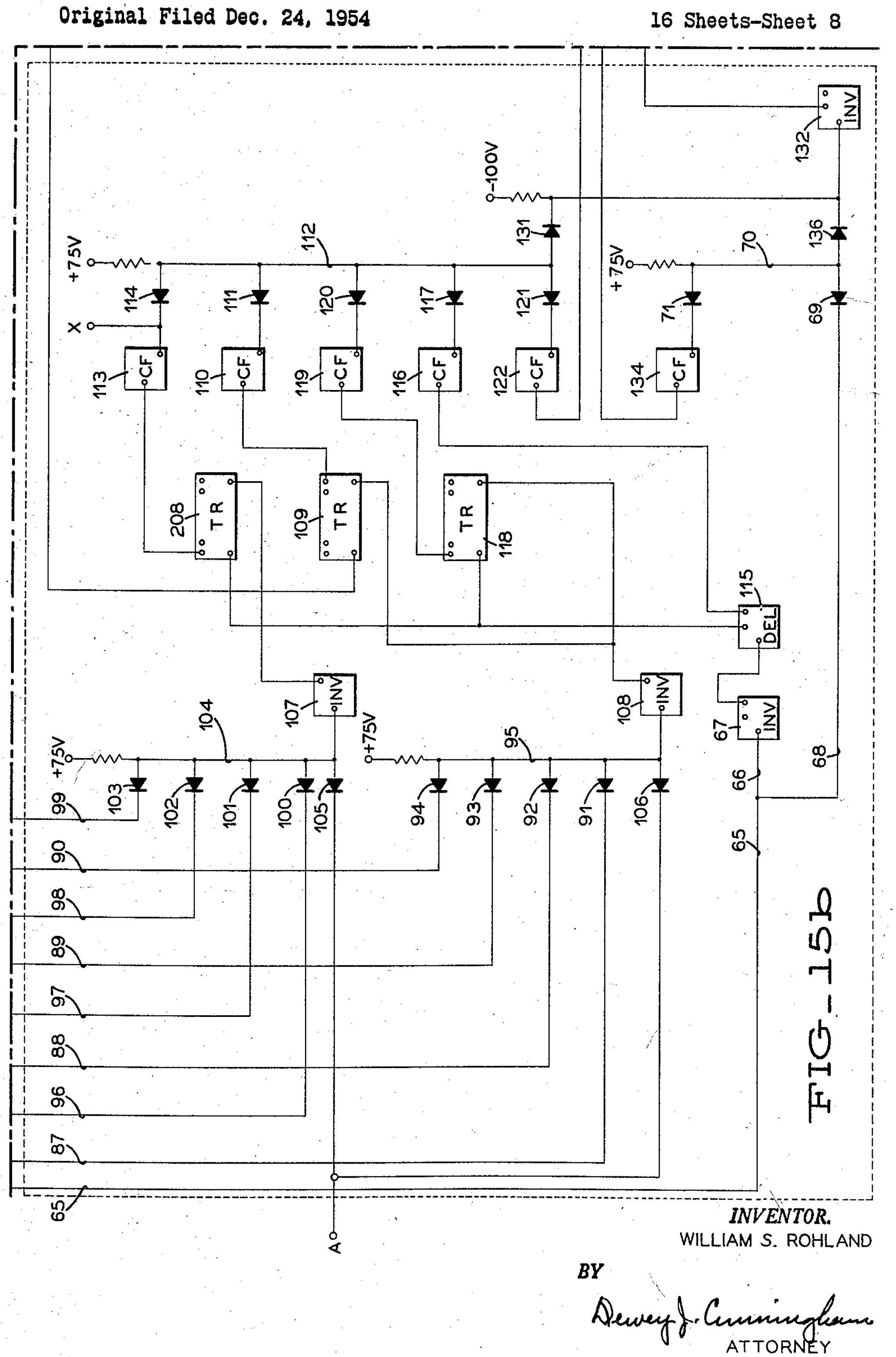
Figure 15C:
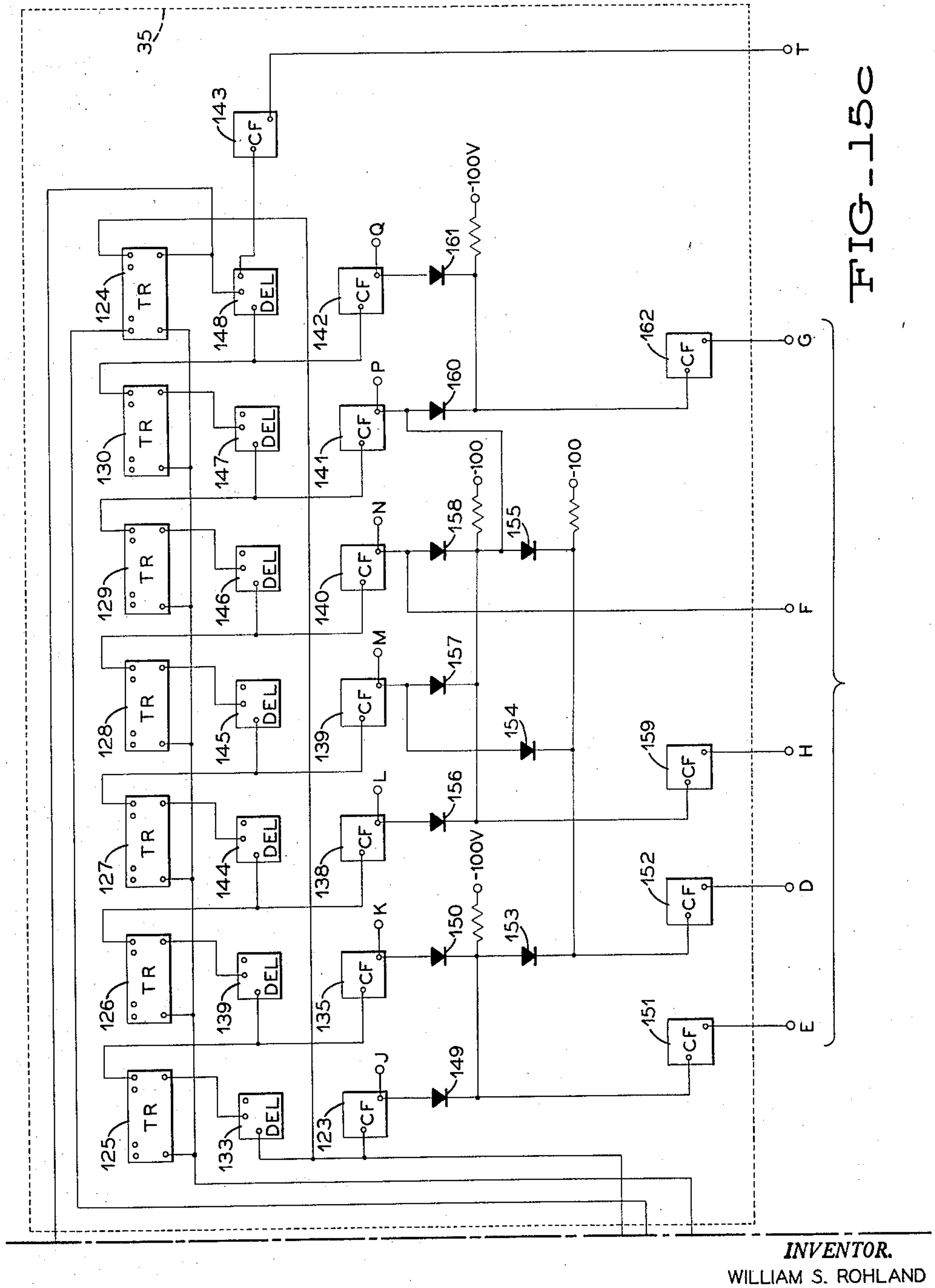
Figures 16A, 19, 23:
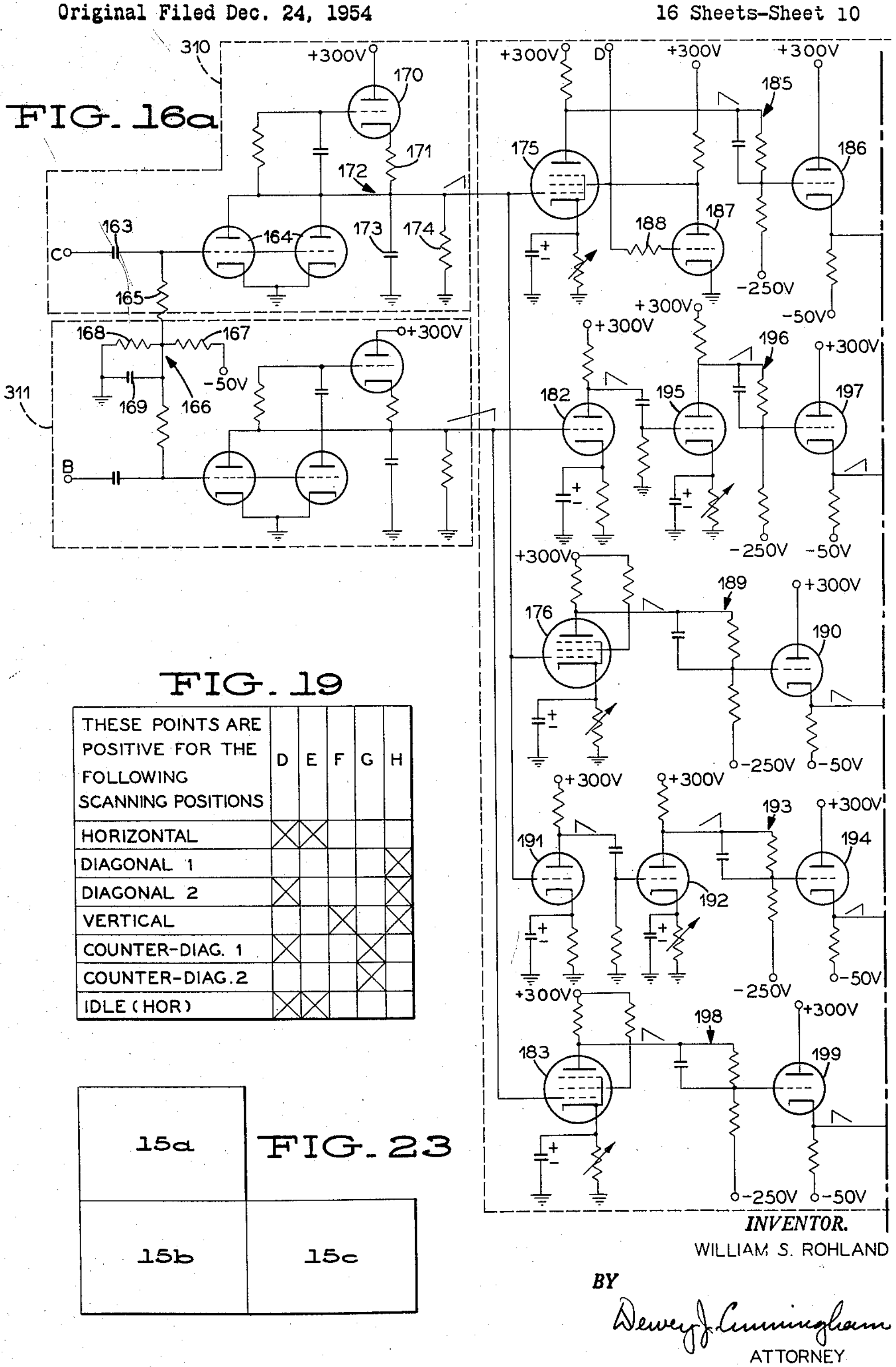
Figure 16B:
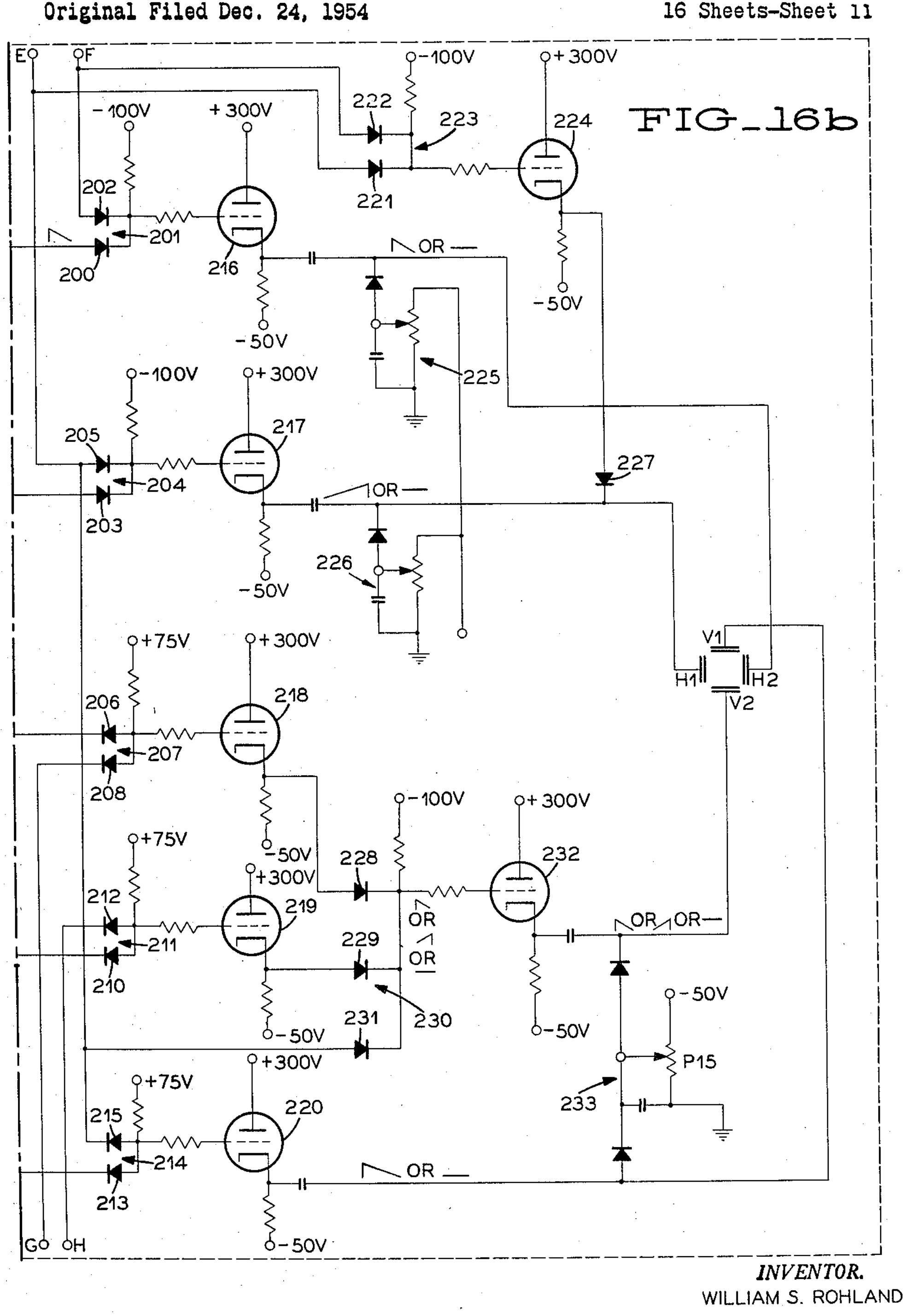
Figure 17A:
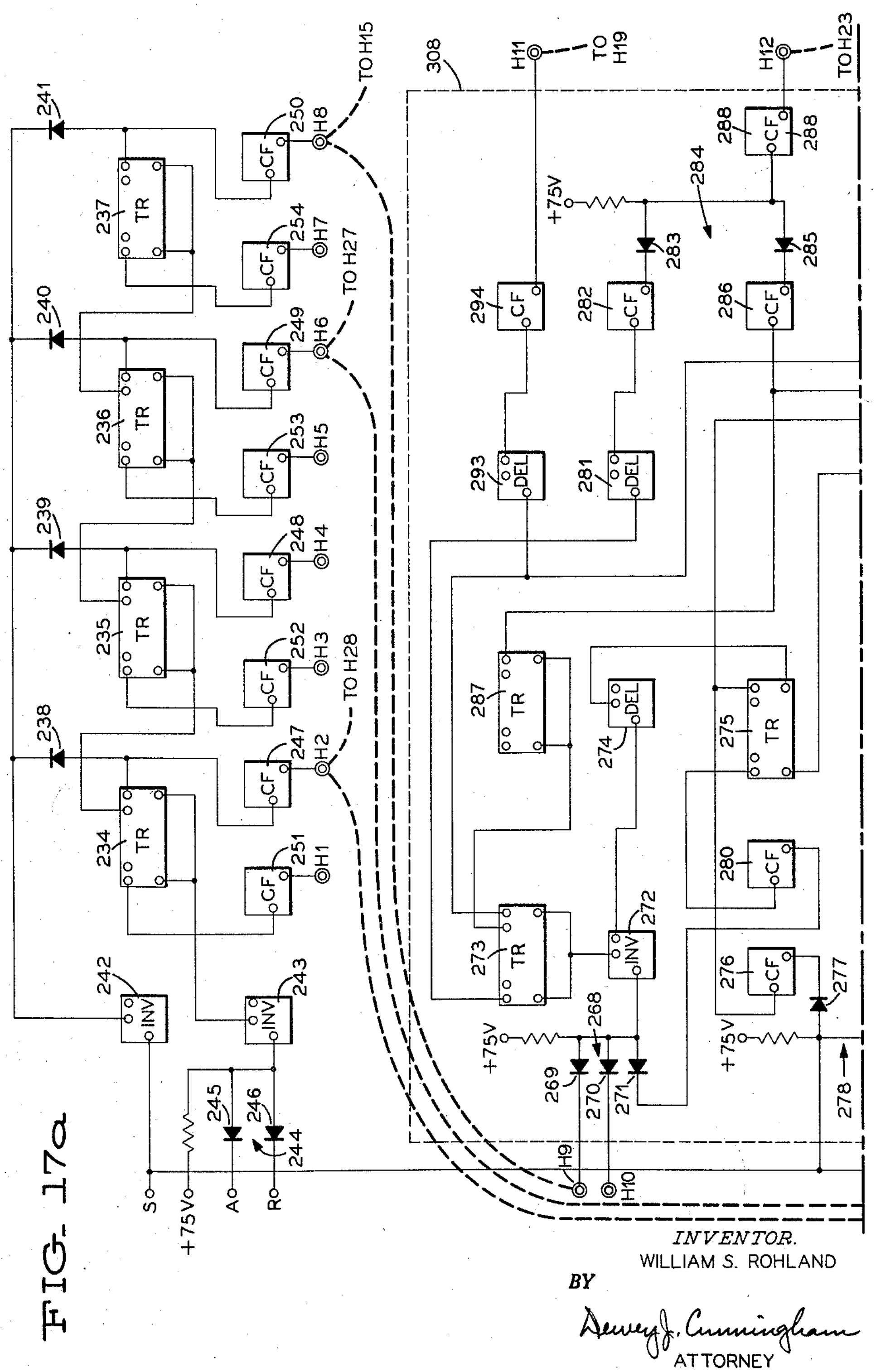
Figure 17B:
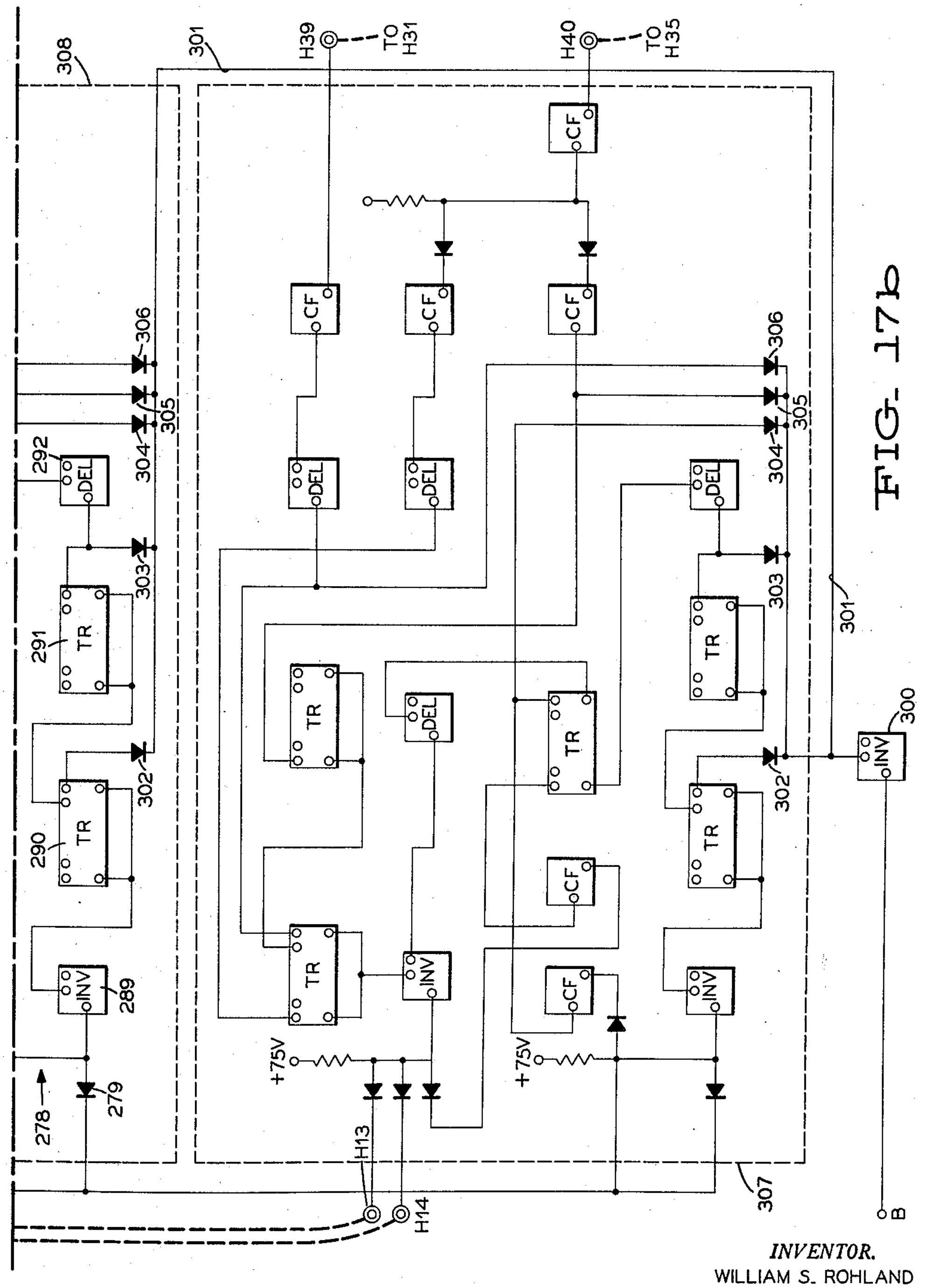
Figure 18:
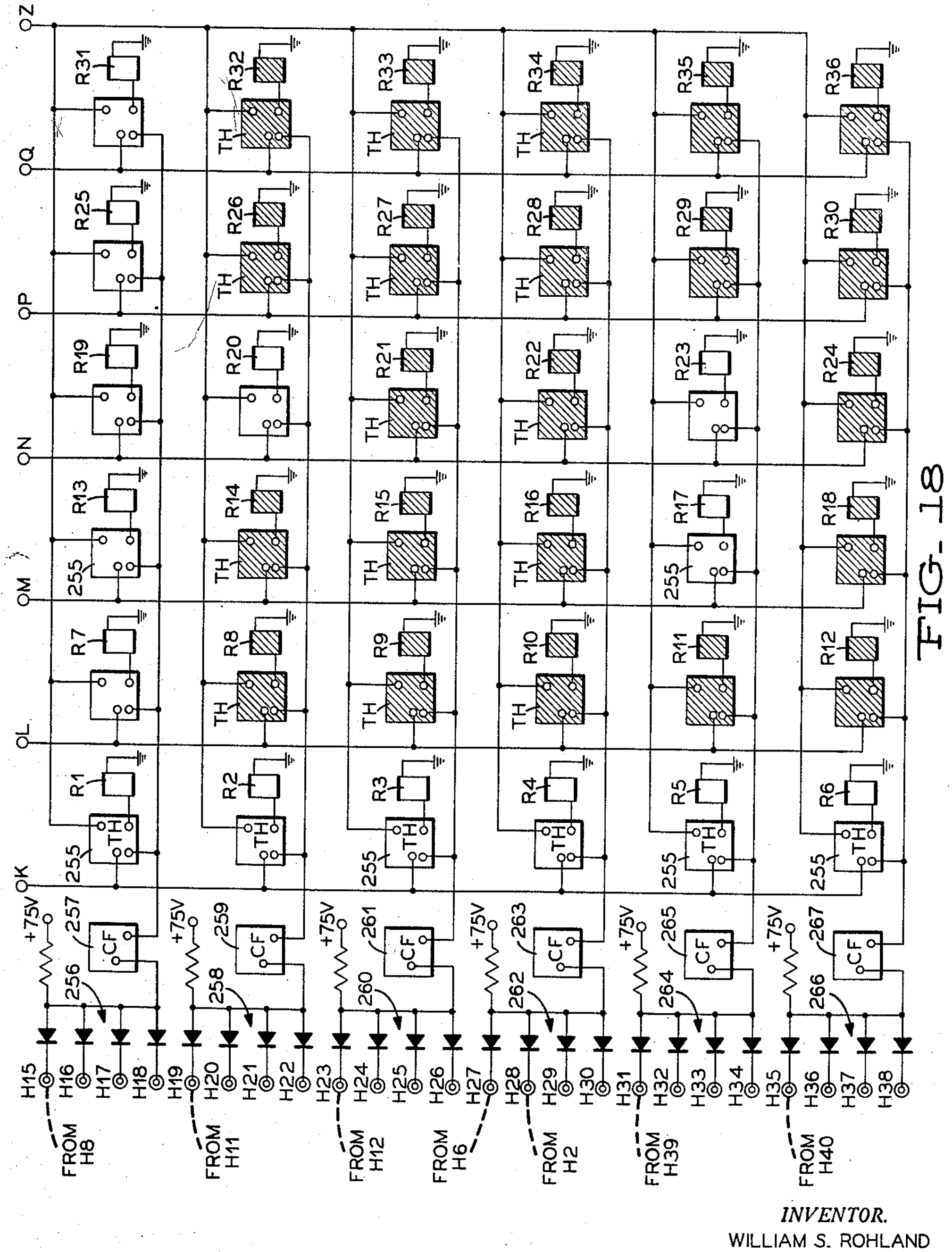
Figure 22:
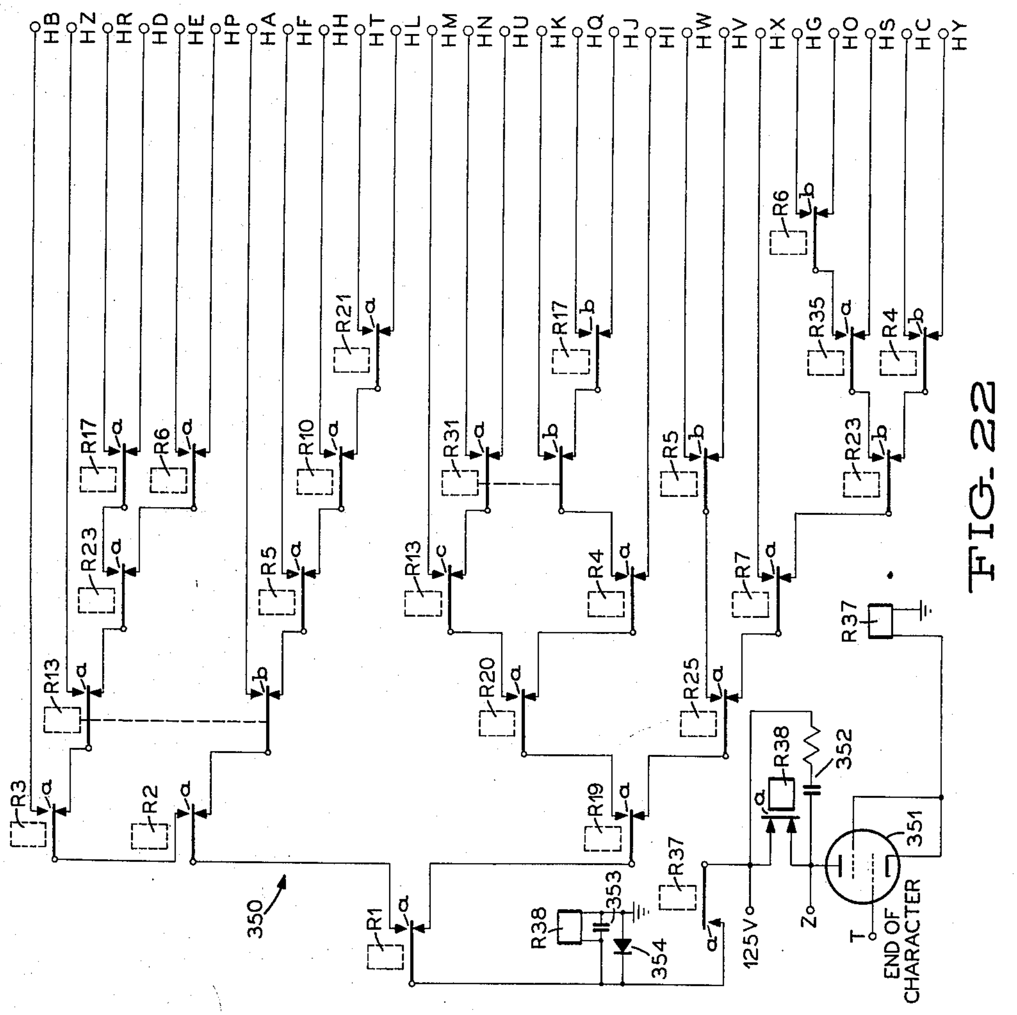
Figure 20:
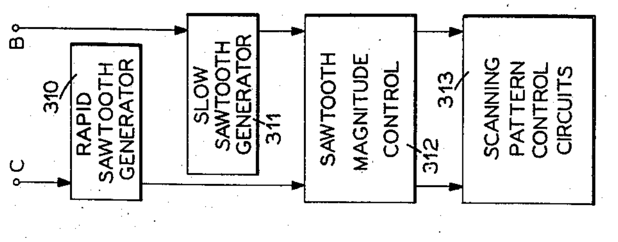
Figure 21:
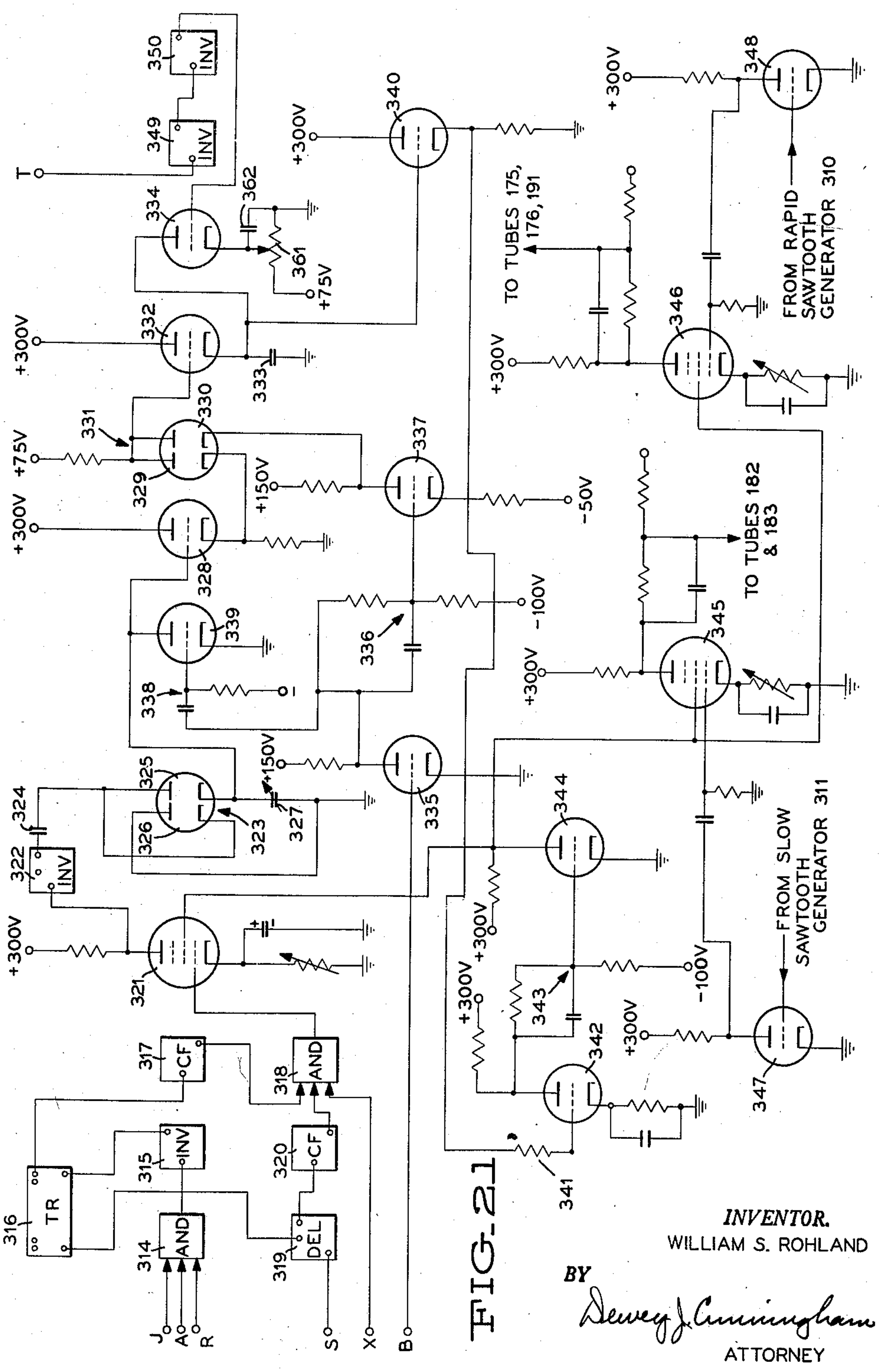

Fig. 10*a* shows the schematic circuit details of a conventional trigger which is illustrated in block form in Fig. 10*b*;

Fig. 11*a* shows the schematic circuit details of a conventional inverter which is illustrated in block form in Fig. 11*b*;

Fig. 12*a* shows the schematic circuit details of a conventional cathode follower which is shown in block form in Fig. 12*b*;

Fig. 13*a* shows the schematic circuit details of a delay unit which is shown in block form in Fig. 13*b*;

Fig. 14*a* shows the schematic circuit details of a conventional thyratron circuit which is illustrated in block form in Fig. 14*b*;

Figs. 15*a*, 15*b* and 15*c* combine to form a block schematic diagram of the control circuits used in the present invention;

Figs. 16*a* and 16*b* combine to form a schematic diagram of the deflection circuits for producing the scanning patterns used in the invention as shown in Figs. 1 through 7;

Figs. 17*a* and 17*b* form a block schematic diagram of the shape computing circuit;

Fig. 18 is a block schematic diagram of the shape memory circuit of the invention;

Fig. 19 is a legend showing the potentials at various points of Figs. 16*a* and 16*b* during the various scanning patterns;

Fig. 20 shows a portion of the invention in block form to illustrate the association of the saw-tooth magnitude control circuit with related circuits;

Fig. 21 is a schematic diagram of the saw-tooth magnitude control circuit;

Fig. 22 is a schematic diagram of the relay contact network which is controlled by the shape memory circuit shown in Fig. 18; and Fig. 23 is a block diagram showing the relationship of Figs. 15*a*, 15*b* and 15*c*.

Similar reference characters represent similar parts throughout the several views.

The basic approach used in the present invention to identify the characteristic line traces, which make up items such as letters and digits, is to scan each line trace individually with a plurality of scanning patterns. The scanning means may take the form of a conventional flying spot scanner provided with horizontal and vertical deflection plates. Voltages are fed to said plates to cause the spot to follow certain predetermined patterns. The characteristic line trace, which will hereinafter be referred to as a character, is adapted to be moved into registration with a physical aperture. Each scanning pattern is then superposed on the aperture so that the patterns the spot makes on the character is only that portion of the pattern which is within the aperture.

Referring to Figs. 2 through 7, each figure shows the different scanning patterns at (*a*) which are produced by the horizontal plate voltages shown at (*b*) and the vertical plate voltages shown at (*c*). General directions of movement of the spot are indicated by arrows. The illustrated general directions are by way of example only, it being understood that other directions of movement could be used to provide the scanning patterns.

Figure 2:
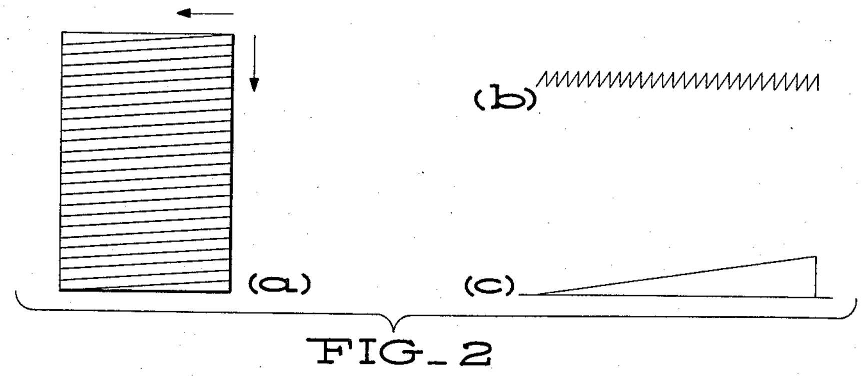
Figs. 2 through 7 show at (*a*) the scanning patterns generated by the horizontal plate voltages shown at (*b*) and the vertical plate voltages shown at (*c*)

Fig. 2 shows the pattern which will be referred to as the horizontal scan. This scan is produced by supplying a plurality of rapid sawtooth voltages to the horizontal plates and a single slow sawtooth voltage to the vertical plates. Thus, the spot or beam of light is caused to be moved rapidly from right to left and slowly from top to bottom. It will be noted that both the rapid and slow sawtooth voltages begin at a reference potential and rise gradually to a peak positive potential, and then drop sharply to the reference potential.

Figure 3:
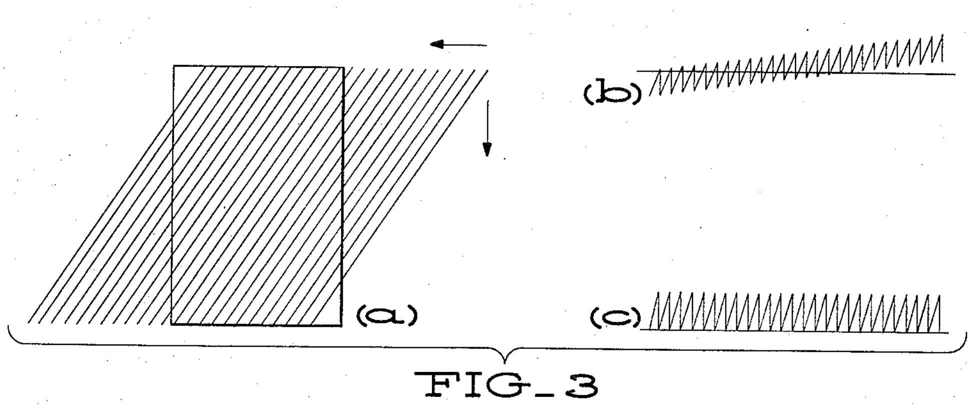

Fig. 3 shows a scanning pattern hereinafter referred to as the first diagonal scan. A spot of light is caused to be moved in a path which is inclined at some predetermined angle with respect to the horizontal. In the particular pattern shown an angle of approximately 55° is used. As the arrows indicate the spot moves in a single sweep from the upper right to the lower left. Successive scans are spaced to the left of the preceding scan. To accomplish this type of sweep, the rapid sawtooth voltage shown at (*b*) in Fig. 3 is supplied to the horizontal deflection plates, and the rapid sawtooth voltage shown at (*c*) in the same figure is supplied to the vertical deflection plates. It will be noted that the starting points for successive sawtooth potentials supplied to the horizontal plates are along a gradually rising reference line. It is this gradually rising reference line which causes successive sweeps to be spaced slightly to the left of a preceding sweep. More specifically the rapid sawtooth voltage shown at (*b*) is applied to one of the deflection plates and a slower sawtooth potential, which follows the gradually rising reference line, is supplied to the other of the horizontal deflection plates.

Figure 4:
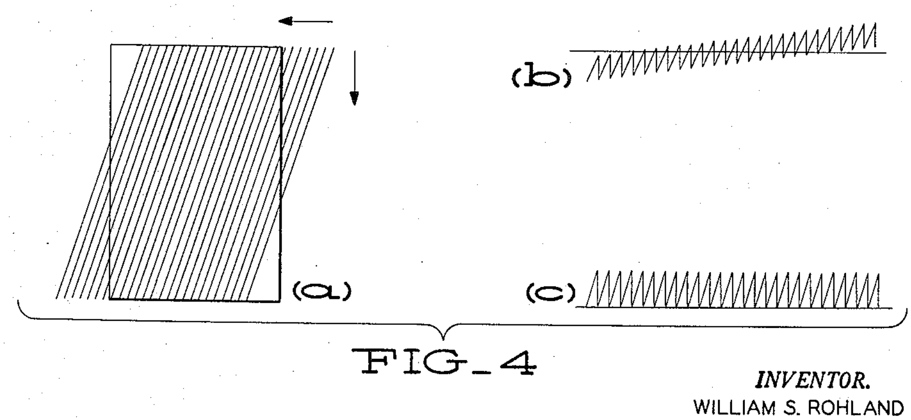

Fig. 4 shows a second diagonal scanning pattern, this pattern differing from the first diagonal scan only to the extent that the spot of light travels a path of greater slope. In this pattern, an angle of 71° is used. The horizontal and vertical scanning voltages differ in that the rapid sawtooth voltage supplied to the horizontal plates during the second diagonal scan are of lesser magnitude than those supplied during the first diagonal scan.

Figure 5:
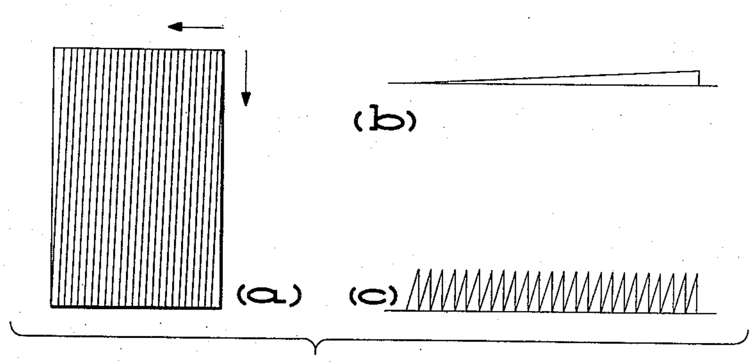

Fig. 5 shows at (*a*) the vertical scanning pattern wherein the spot travels rapidly from top to bottom and slowly from right to left. This scan is produced by supplying a single slow sawtooth voltage, shown at (*b*), to the horizontal plates, and a plurality of rapid sawtooth voltages, shown at (*c*), are fed to the vertical plates.

Figure 6:
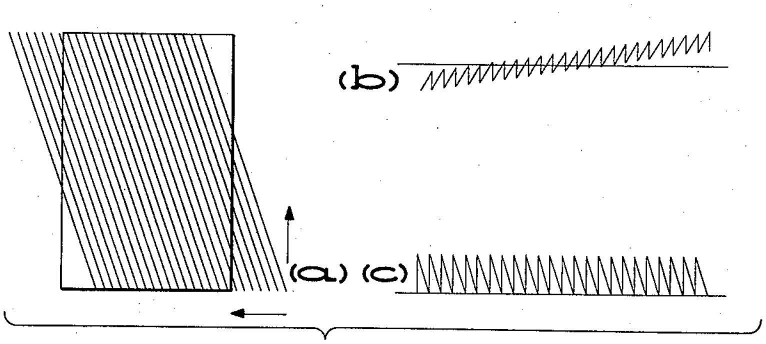

Fig. 6 shows at (*a*) the first counterdiagonal scan in which the spot travels along a path which is inclined with respect to the horizontal by the same angle as during the second diagonal scan. However, if the slope during the second diagonal scan will be referred to as positive the slope of the first counterdiagonal scan would be negative. According to the arrows the spot travels from the lower right towards the upper left and succeeding sweeps are spaced to the left of a preceding sweep.

Figure 7:
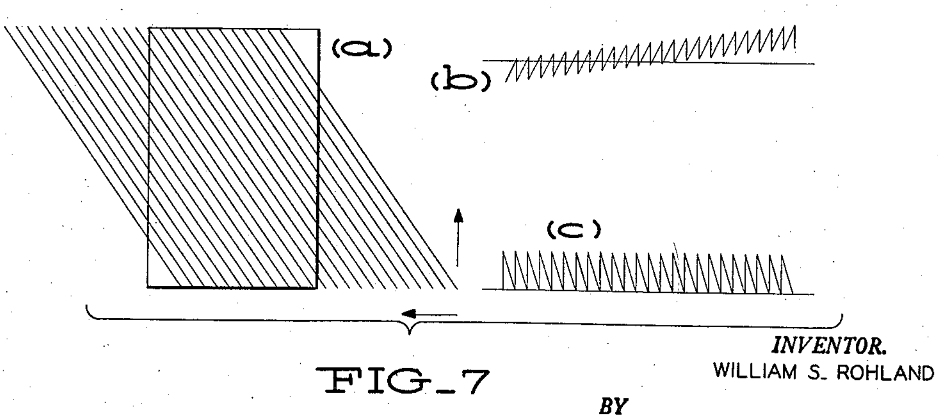

Fig. 7 shows at (*a*) the second counterdiagonal scanning pattern. The only change necessary to go into this pattern from the preceding pattern is to increase the amplitude of the rapid sawtooth voltage supplied to the horizontal plates.

During each scanning pattern a character which is within the physical aperture is traversed by the spot of light. In general, means are provided to count the number of substantially straight lines of different predetermined lengths, traversed by the spot during each scan. For example, as shown in Fig. 8, a treatment of the capital letters of the elite gothic type font is made. It should be borne in mind that a treatment such as this is made for perfect characters. Should there be missing portions of a character the count will be decreased during certain scan lines. However, this will not materially affect the ability of the apparatus to recognize the character since a certain tolerance is furnished. The characters are shown at the left-hand side of Fig. 8. For each of the scanning positions, i.e., the horizontal, first diagonal, second diagonal, vertical, first counterdiagonal and second counterdiagonal, a number of relays are provided. These relays, numbered R1 through R36, govern a decoding network circuit in a manner which will be explained at a later point in the description.

Under each scan, the count for each character is shown. For example, during the horizontal scan three eight counts are obtained for the character "B." For the present embodiment, and by way of example only, at least an eight count will be considered as a long count and anything between a five count and an eight count will be obtained for each line of scan. However, where there is a long count, there will be at least one short count. This is due to the fact that the count must go through five in order to reach eight.

The first three relays associated with each scanning pattern, i.e., relays R1, R2 and R3 for the horizontal scan, indicate one, two and three long counts, respectively. The second three relays associated with each scanning pattern, i.e., relays R4, R5 and R6 for the horizontal scan, indicate one, two and three short counts, respectively. An "X" indicates relays which are energized for particular characters during each scan.

Before explaining the invention in greater detail, a brief description will be given of certain conventional circuits, shown by way of example only, which may be used in the instant invention.

Figure 9:
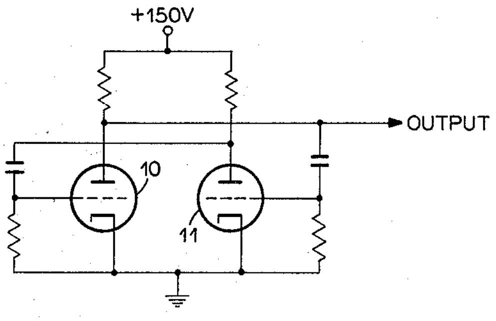
Fig. 9 shows the schematic details of a conventional multivibrator which is used as a signal source in the present invention.

Fig. 9 shows a conventional multivibrator circuit which includes triodes 10 and 11 each of which is provided with the usual plate resistor connected to the positive plate source of potential. The plate of tube 10 is RC coupled to the grid of tube 11 and the plate of tube 11 is RC coupled to the grid of tube 10. The cathode of each tube is connected to ground. The parameters of the capacitors and resistors associated with each tube are such that tubes 10 and 11 conduct alternately. That is, while tube 10 begins to conduct tube 11 is going towards cut-off. When the potential is first applied across the tubes, variations in load resistors and tube construction causes one of the tubes to begin conducting first. For example, if tube 10 begins conducting first the plate potential thereof decreases. Since this plate is RC coupled to the grid of tube 11, tube 11 goes toward cut-off. Thus, the plate voltage of tube 11 rises and causes tube 10 to approach saturation. When tube 11 is cut off, the plate thereof rises to the source potential and begins to charge the capacitor associated with tube 10. As the capacitor charges, the grid of tube 10 becomes less positive and the electron flow in this tube begins to decrease. The moment this occurs the plate voltage of tube 10 begins to rise. This rising voltage is RC coupled to the grid of tube 11 causing the last-named tube to begin conducting. The frequency with which the tubes alternately conduct is dependent upon the time constant of the RC networks. In the present instance the output potential is taken from the plate of tube 10.

In the schematic circuit diagram all triggers are represented by blocks such as that shown in Fig. 10*b*. The details within each block may be identical with the circuit shown in Fig. 10*a*. This circuit is in the form of a pair of triodes 12 and 13 having plate resistors 14, 15 and 16, 17, respectively, said plates being connected through these resistors to a source of positive potential. In order to relate the various pick-off points in the schematic diagram of Fig. 10*a* to the terminals shown in the block in Fig. 10*b*, letters *a* and *b* indicate the plate connections of tubes 12 and 13, respectively, and letters *c* and *d* represent the points between resistors 14, 15 and 16, 17, respectively. The input pulses to the grids of tubes 12 and 13 are adapted to be supplied to terminals *e* and *f*, respectively, said pulses being supplied to the grids through capacitors 18 and current limiting resistors 19. A point between capacitor 18 and resistor 19 is connected through a resistor 20 to a negative source of potential. The plate of each tube is coupled through a parallel RC network to the afore-mentioned point associated with the opposite tube. The normal condition, whenever the trigger is considered to be "off," is when tube 13 is conducting. Therefore, the plate of tube 13 is dropped in potential from the positive source potential and has dropped the grid of tube 12, thereby keeping tube 12 cut off. With tube 12 cut off, the plate potential thereof has risen to the positive source potential, this potential being supplied to the grid of tube 13 to keep tube 13 conducting. When a negative pulse is supplied to terminals *e* and *f* tube 13 is turned off, causing tube 12 to be turned on. This condition is referred to as the "on" condition. The next negative pulse turns tube 12 off, causing tube 13 to be turned on, thereby returning the trigger to the "off" condition.

Fig. 11*a* shows the schematic details of an inverter which may be used in the present invention. The inverter is shown in block form in Fig. 11*b*. This inverter comprises a triode 21, the usual plate resistors connected to a positive potential. The input to the grid from terminal *g* is through the usual current limiting resistor. The terminal *h* connects to a point between the plate resistors and the terminal *i* connects directly to the plate.

Fig. 12*a* shows the schematic details of a cathode follower circuit which is represented in block form in Fig. 12*b*. The circuit includes a triode 22 the plate of which is connected directly to a positive source of potential and the cathode of which is connected through a resistor 23 to a negative source of potential. The input to the circuit is to terminal *j*, which is connected through a current limiting resistor to the grid of the triode, and the output is taken directly from the cathode and supplied to terminal *k*. The operation is such that the cathode output always follows the grid input. As the controlling grid begins to increase in potential, for example, the tube begins to conduct, causing the cathode to rise from the negative potential to which it is connected by an amount proportional to the input. As the input potential to the grid decreases the cathode potential also decreases proportionally. In the present invention, where the cathode follower is fed by a trigger or an inverter, a divider input may be used.

Fig. 13*a* shows the schematic details of a delay circuit shown in block form in Fig. 13*b*. This circuit comprises a triode 24 and includes a pair of plate resistors 25 and 26 which are connected to a positive source of plate potential, the cathode being connected to ground. The input pulse is supplied to terminal *q* which connects through a capacitor 27 and a current limiting resistor 28 to the grid of the triode. A point between capacitor 27 and resistor 28 is connected through a resistor 29 to the afore-mentioned positive source of potential. The output potential may be taken from terminal *m* which is between resistors 25 and 26 or from terminal *n* which connects directly to the plate. The operation of this circuit is such that the tube is normally conducting. A negative input pulse is differentiated by resistor 29 and capacitor 27, providing a negative pulse at the junction of capacitor 27 and resistor 28, which falls sharply with the leading edge of the input pulse. The afore-mentioned narrow negative pulse cuts the triode off, causing the plate potential to rise sharply. The plate potential stays up until said narrow negative pulse passes and the potential at the junction of capacitor 27 and resistor 28 rises to a point where the tube can begin conducting again. Thus, the trailing edge of the plate output pulse occurs a predetermined time after the tube is cut off. This trailing edge may be used to perform various functions, one of such functons being to operate a trigger. The output from terminal *m* and *n* will be positive pulses of different amplitudes, i.e., the pulse from terminal *m* will be of higher amplitude than the pulse from terminal *n*.

Fig. 14*a* shows the details of a conventional thyratron circuit which is illustrated in block form in Fig. 14*b*. The thyratron includes a tube 30 having its plate connected through a resistor to a positive source of potential and its cathode connected to a relay coil. The terminal to which the positive source of potential is supplied is indicated by reference character *p*, and the terminal from the cathode, which is adapted to be connected to the relay coil, is provided with a terminal *x*. The shield grid input is from the terminal *w* and the control grid input is from the terminal *z*, both grid inputs being through an appropriate current limiting resistor. The operation of the thyratron is such that the tube 30 is placed in conduction only when a pulse occurs on the shield grid at the same time that a pulse occurs on the control grid. When the tube goes into conduction the cathode potential rises, causing a flow of current through the relay coil so as to operate the relay.

Figure 1:
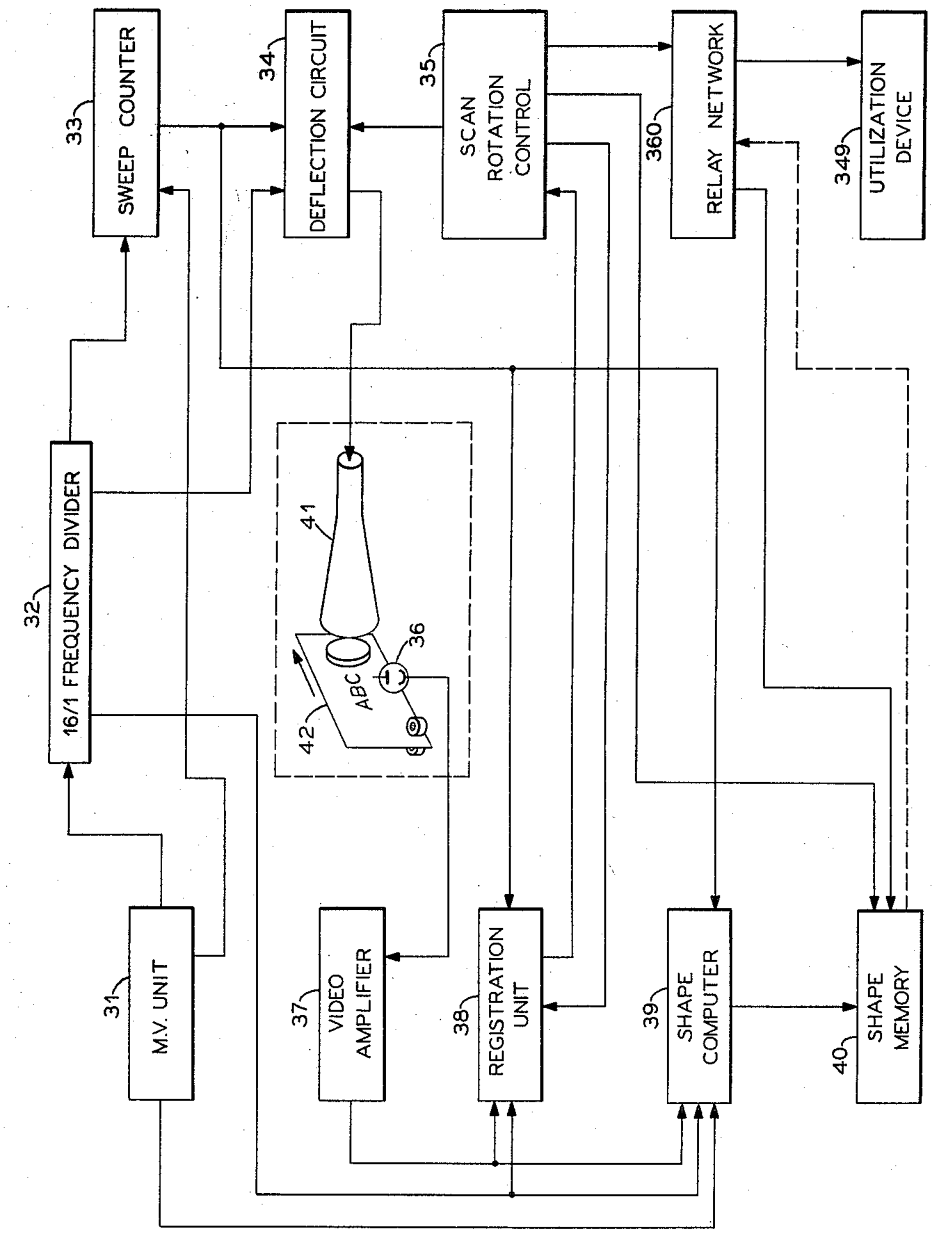
Fig. 1 is a block diagram of the overall system.

Referring to Fig. 1, a function block diagram of the present invention is shown. The general approach of the invention is to scan the character in the patterns afore-mentioned. There are twenty-four lines of each frame of scanning. Each line is divided up into sixteen bits of sampling pulses. Thus, the scanning field is quantized into sixteen times twenty-four, or three hundred and eighty-four, bits. Not all of these bits are within the physical aperture. As a line of sweep passes over the character, a count is made of the number of bits along the outline of the character on the sweep. For example, on the character "A" during the horizontal scan, a small number of counts are provided when successive sweeps intersect the diagonal lines of the character. A long count is received on the sweep which intersects the crossbar.

Provision may be made for counting all bits of a character intercepted on a line of sweep. Certain criteria may be set up such that lines of sweep which contain at least eight bits may be considered long counts and lines of sweep which contain at least five bits may be considered short counts, the arrangement being such that any time there is a long count, there is a short count. The number of short counts and long counts during certain scanning patterns may be stored in a shape memory unit and later combined to form a code for the character being scanned.

A multivibrator unit 31 provides a series of pulses of fundamental frequency. These pulses are fed to a 16/1 frequency divider 32 which provides an output pulse for every sixteen input pulses. These output pulses will be referred to as end of line pulses. The end of line pulses are fed to a sweep counter 33 which counts up to twenty-four and then supplies an output pulse which will be referred to as an end of frame pulse.

The deflection circuit 34 receives end of line pulses from frequency divider 32 and end of frame pulses from sweep counter 33. The end of line pulses are used to generate the rapid sawtooth potential and the end of frame pulses are used to generate the slow sawtooth potentials. The determination of the combining of these potentials is made by the scan rotation control 35. Before a character comes into registration with the scanning field the scan rotation control causes the deflection circuit to generate the idle horizontal scan. Therefore, means must be provided to determine when registration occurs. This function is accomplished by the registration unit 38.

The registration unit receives end of line pulses from frequency divider 32, end of frame pulses from sweep counter 33, and the video information from video amplifier 37. It will be seen that the output from the video amplifier will be the data obtained during the idle horizontal scan by cathode ray tube 41. Document 42 is adapted to be moved past the cathode ray tube so that the characters on the document have motion relative to the scanning device.

In the registration unit, circuits are provided for determining when a character to be scanned has entered the left side of the physical aperture, when the character which has just been scanned has left the right side of said aperture, and when the character to be scanned is in registration within the aperture. When registration occurs, a signal is supplied to the scan rotation control to tell it to initiate the scanning patterns. Upon initiation of the scanning patterns a signal is supplied back to the registration unit to allow end of frame pulses to pass through the registration unit to the scan rotation control. Each end of frame pulse so supplied causes a new scanning pattern to be initiated in the deflection circuits. Upon the ending of the last counterdiagonal scan a signal is fed from the scan rotation control circuit to the registration unit to block the end of frame pulses from passing through the registration unit. Thereafter, scan rotation control 35 retains the deflection circuit 34 in the idle horizontal scanning pattern until registration of a subsequent character. Simultaneously with the blocking signal an end of character pulse is provided from the scan rotation control.

The shape computing circuit 39 includes an "and" circuit which receives the video data from video amplifier 37 and the line sampling pulses from multivibrator unit 31. Every time there is coincidence between any of the sixteen sampling pulses and a video signal, a signal is furnished to a counter which can count up to fifteen. At the end of each line of scan, an end of line pulse from frequency divider 32 resets the counter for the next line of scan. Signals after each five count and each eight count are fed to the shape memory unit 40. However, the arrangement is such in the shape computer that once a five count or an eight count is provided, no further five counts or eight counts will be furnished until three more lines of scan have been completed. This means that any one substantially straight portion of the character will provide only one count, even though it may be scanned more than once. An end of frame pulse from sweep counter 33 resets the shape computer in its entirety so that it is ready for the next scanning pattern.

The shape memory unit 40, as aforementioned, receives signals which indicate the number of short counts or long counts during a particular scanning pattern. This information is entered into particular portions of the shape memory as determined by the scan rotation control. Thyratrons in the shape memory set up relays of relay network 360. The end of character pulses from the scan rotation control signals that it is time to read the relay network for obtaining an identification signal to supply to the utilization device 349 for control purposes.

Figs. 15*a*, 15*b* and 15*c*, when combined as shown in Fig. 23, show the control circuits for the rotating scan of the present invention. A multivibrator 44 in the multivibrator unit 31 supplies a series of pulses to an inverter 45, the plate output of which is supplied to an inverter 46. The tapped plate output of inverter 45 is connected through a line 47 to a trigger 48 in the sweep counter circuit 33. The direct plate output from inverter 46 is supplied through a line 49 to delay circuit 50. The output signal from delay circuit 50 is a slightly delayed negative pulse which is inverted in inverter 78 and fed through cathode follower 79 to terminal R. The positive pulses at terminal R occur at the frequency of the multivibrator and are the line or sampling pulses.

The tapped plate output from inverter plate 46 is supplied through line 51 to a trigger 52 in said frequency divider. The frequency divider includes triggers 52, 53, 54 and 55 which form a four position binary counter. The triggers are connected in a manner well known in the art to form such a counter. When sixteen pulses have been received by the counter, trigger 55 will be turned "off" sending a negative pulse from the right side thereof to trigger 56 in sweep counter circuit 33. The pulses supplied to the sweep counter represent end of line pulses. The sweep counter circuit includes triggers 56, 57, 58, 59 and 60 which are arranged to form a modified form of binary counter. In the present invention it is desired to use 24 lines of scanning to each frame. Therefore, in order to get the end of frame pulse it is necessary to count 24 end of line pulses. The arrangement is such that when the first pulse is received by trigger 56 this trigger is turned "on" the next end of line pulse turns trigger 56 "off," and trigger 57 "on." When the eighth pulse has been received by trigger 56, trigger 59 has been turned "on." A negative pulse is supplied from the left side of trigger 59 to the delay circuit 61. After a short time delay a negative pulse is supplied from delay circuit 61 to the plate of the left side of trigger 58 turning trigger 58 "on." When the twelfth pulse is received by trigger 56, triggers 56, 57, 58 and 59 will be turned "off."

When trigger 59 is turned "off" trigger 60 is turned "on." The tapped plate output from the right side of trigger 60 is positive going and is supplied to the right side of trigger 48. This, however, does not change the condition of trigger 48 since it is responsive only to negative pulses. A thirteenth pulse, and the succeeding pulses thereafter, cause the same sequence of events in the trigger circuits as was obtained during the first eleven counts. However, when the twenty-fourth pulse is received by trigger 56, trigger 60 is turned "off." At this time trigger 48 is turned "on." Shortly thereafter the negative pulses from inverter 45 turn trigger 48 "off."

When trigger 48 turns "on" on the twenty-fourth pulse, as previously described, a positive pulse is supplied to cathode follower 64. The output from the cathode follower is supplied to terminal B as an end of frame pulse. The output from the cathode follower 64 is also supplied through lines 65 and 66 to inverter 67, and through lines 65 and 68 to leg 69 of "and" circuit 70, the other leg of said "and" circuit being designated by numeral 71. Inverter 67 and "and" circuit 70 are both in the registration unit 38, Fig. 15*b*.

Referring again to frequency divider 32 in Fig. 15*a*, it will be remembered that a negative pulse was fed to the sweep counter circuit from trigger 55 as an end of line pulse. This occurred when trigger 55 was turned "off." At the same time the trigger 55 turns "off" a positive pulse is fed from the plate of the left side of said trigger 55 to cathode follower 72. The output of the cathode follower is a positive pulse and is fed through lines 73 and 74 to an inverter 75. The inverter output is in the form of a negative pulse and is supplied to the delay unit 76. The output of the delay unit is a narrow positive pulse which begins to go positive at the same time the input to the delay circuit begins to go negative. Thus, the function of the delay unit in this instance is similar to a differentiating amplifier and has the effect of narrowing the positive input thereto. This narrow positive pulse is supplied through cathode follower 77 to terminals S and C as an end of line pulse.

Referring to Fig. 15*a* and particularly to frequency divider 32, the outputs from the plates of the left and right sides of trigger 52 are supplied to cathode followers 80 and 81, respectively. The outputs from the plates of the left and right sides of trigger 53 are supplied to cathode followers 82 and 83, respectively. The outputs of the plates of the left and right sides of trigger 54 are supplied to cathode followers 84 and 85, respectively, and the outputs from the plates of the left and right sides of trigger 55 are supplied to cathode followers 72 and 86, respectively. It will be seen that when one of triggers 52 through 55 is "off," the cathode follower connected to the plate of the right side will have a relatively low output, while the cathode follower associated with the plate of the left side will have a relatively high output. This is true since the cathode followers reflect the voltages on the plates to which they are connected. The outputs are reversed when the trigger is "on."

Cathode followers 80, 82, 84 and 72 connect through lines 87, 88, 89 and 90, respectively, to legs 91, 92, 93 and 94, respectively, of "and" circuit 95, Fig. 15*c*. The cathode followers 81, 83, 85 and 86 connect through lines 96, 97, 98 and 99, respectively, to legs 100, 101, 102 and 103, respectively, of "and" circuit 104. The video data from video amplifier 37 is supplied to terminal A. The indication of an interception of a portion of the character provides a positive pulse to legs 105 and 106 in "and" circuits 104 and 95, respectively. It will be remembered that video pulses are of varying length being dependent upon the length of time during the sweep that they are on a portion of the character being scanned.

The registration unit utilizes the conditions of the triggers which form the counter in the frequency divider, at the counts of 15 and 16, or zero, to determine when registration occurs. The arrangement is such that a count of 15 occurs when the beam is at one end of the line of scan and a count of 16 or zero occurs when the beam is at the other end of said line. Thus, if video data is picked up at the count of zero time, followed by an absence of video data at counts 15 and zero within the same frame of scan, an indication of registration is made.

It will be noted that "and" circuit 104 will pass the video signal only when triggers 52, 53, 54 and 55 are "on." Also, the video pulse can get through "and" circuit 95 only when triggers 52–55 are turned "off." All the triggers are turned "on" only when the frequency divider has counted up to 15 and all the triggers are turned "off" only when the frequency divider has counted up to 16, or zero. The fifteenth pulse is considered to occur at the end of the line of scan and the sixteenth, or zero, pulse is considered to occur at the beginning of the line. As the character just scanned begins to leave the left side of the scanning aperture, some portion of it will be positioned where the fifteenth pulse occurs. As a new character begins to enter the right side of the scanning aperture, the light beam, on at least one of the twenty-four lines of scan of a particular frame, will intercept the outline of the character in coincidence with the sixteenth, or zero pulse. Therefore, at the count of 15, a positive pulse is fed through "and" circuit 104 to inverter 107, and at the count of 16, or zero, a positive pulse is fed through "and" circuit 95 to inverter 108. The negative pulse from inverter 107 flips trigger 208 while the negative pulse from inverter 108 flips triggers 109 and 118. The plates of the left side of triggers 208 and 118 connect through cathode followers 113 and 119, respectively to legs 114 and 120, respectively, of "and" circuit 112. The plate of the right side of trigger 109 connects through cathode follower 110 to leg 111 of "and" circuit 112. It will be seen that under the conditions where video data is seen at counts 15 and zero, legs 114 and 120 are down and leg 111 is up. It will be remembered that the sweep counter circuit supplies an end of frame signal from the cathode follower 64 over lines 65 and 66 to inverter 67. The output signal from inverter 67 is a negative pulse which is supplied to delay unit 115. Therefore, the output from delay 115 is a positive pulse which is used as a sampling pulse in one instance, being supplied to cathode follower 116 which connects to leg 117 of "and" circuit 112. Therefore, at the end of each frame a sampling pulse is fed to "and" circuit 112 which will read the circuit providing all legs are up in potential. As the positive pulse from delay unit 115 begins to go negative, this negative portion turns "off" triggers 208 and 118. Referring to Fig. 15c, trigger 124 is "on" during the idle horizontal scan. At this time the plate of the right side thereof is relatively positive and feeds to cathode followers 123 and 122, the latter cathode follower being connected to leg 121 of "and" circuit 112. Thus, leg 121 is always up during the idle horizontal scan. Also, during the idle horizontal scan cathode follower 134 is held down in potential by the plate of the left side of trigger 124. This keeps leg 71 of "and" circuit 70 down so that the end of frame pulse to leg 69 of the "and" circuit cannot pass to diode 136 and inverter 132. Trigger 109 is not reset by delay 115 and therefore it remembers that a new character is entering the scanning field. In the first frame during which no video data is seen at counts zero and 15, there will be not output from "and" circuits 95 and 104, respectively. Thus, triggers 118 and 208 remain "off" and legs 120 and 114 which are respectively associated therewith, are up. A positive potential at leg 114 indicates that during this frame of scan no video data was seen at count 15. The positive potential at leg 111 indicates that on a previous frame video data was seen at the count of zero, which means that a new character has entered the scanning field. A positive potential at leg 120 indicates that during this frame no video data was seen at the count of zero. Thus, all conditions for registration are fulfilled. At the end of the frame during which the conditions are fulfilled, an end of frame pulse from delay 115 brings leg 117 positive so that a positive pulse is supplied to a diode 131 of an "or" circuit which also includes a diode 136. This positive pulse is supplied to inverter 132 since in an "or" circuit only one leg must be positive. The output from inverter 132 is a negative pulse which is used as a shift pulse for a trigger ring in the scan rotation control circuit 35. The trigger ring includes triggers 125, 126, 127, 128, 129, 130 and 124. The ring is such that only one trigger can be "on" at one time.

When this first pulse comes through to the shift bus, it has the effect of turning "off" trigger 124. When this occurs a negative pulse is fed from the plate of the right side of trigger 124 to delay unit 133. The delay unit output is in the form of a positive pulse. However, the pulse is quite narrow and the negative going edge of the pulse is used to flip trigger 125 "on." The aforementioned negative pulse from trigger 124 is also supplied to cathode followers 123 and 122 so as to block "and" circuit 112. That is, the resulting negative voltage brings down leg 121 of the "and" circuit. However, when trigger 124 turns "off" a positive pulse was supplied from the plate of the left side of said trigger to cathode follower 134 which feeds to leg 71 of "and" circuit 70. Therefore, let us assume that during this time a horizontal scan takes place. At the end of the frame for the horizontal scan a positive pulse is supplied through "and" circuit 70 and diode 136 to inverter 132. This sends a negative shift pulse to the shift bus for the trigger ring. Therefore, trigger 125 is turned "off." When this occurs a negative pulse is supplied from the plate of the right side of trigger 125 to delay unit 139. The trailing edge of the positive output pulse from delay 139 is used to turn trigger 126 "on." While trigger 126 is "on" the first diagonal scan takes place. At the end of the frame for the first diagonal scan a positive pulse is supplied through "and" circuit 70 and diode 136 to inverter 132. The inverter supplies a negative shift pulse to the shift bus for the afore-mentioned trigger ring and trigger 126 is turned "off" and trigger 127 is turned "on." This procedure continues until trigger 124 is again turned "on" at which time the last counter-diagonal scan will have been completed. At this time the positive pulse output of delay unit 148 feeds cathode follower 143, and its output to terminal T is used as an end of character pulse. The trailing edge of the output of delay unit 148 also feeds back to reset trigger 109. Also, when trigger 124 goes "on," cathode followers 122 and 134 reverse in polarity through circuits previously described. Thus, further shifting of the trigger ring is prevented by blocking "and" circuit 70 and the first condition for the registration of the next character is met. The output from the plates of the right sides of triggers 125, 126, 127, 128, 129, 130 and 124 are supplied to cathode followers 135, 138, 139, 140, 141, 142 and 123, respectively.

The outputs from triggers 127, 128, 129, 130 and 124, are also supplied to delay units 144, 145, 146, 147 and 148, respectively. These delay units are used for the coupling between the plate output of the right side of one trigger to the grid input of the next succeeding trigger.

In order to produce the various scanning patterns the outputs from the triggers of the trigger ring in the scan rotation control must be combined in a predetermined manner. This is accomplished by a plurality of "or" circuits. The arrangement is such that cathode followers 123 and 135 feed through diodes 149 and 150 to cathode follower 151, the output of said cathode follower being fed to terminal E. The output of cathode followers 123, 135, 139 and 141 are connected through appropriate diodes to cathode follower 152, the output of said cathode follower being fed to terminal D. The outputs from cathode followers 138, 139 and 140 are fed through diodes 156, 157 and 158 to cathode follower 159, respectively, the output from said cathode follower being fed to terminal H. The output from cathode follower 140 is picked off before diode 158 and connected directly to terminal F. The output of cathode followers 141 and 142 are connected through diodes 160 and 161 to cathode follower 162, respectively, the output of the last-named cathode follower being supplied to terminal G.

The afore-mentioned terminals E, D, H, F and G are all adapted to be connected to the terminals having the same identification in the deflection circuits shown in Fig. 16. Cathode followers 123, 135, 138, 139, 140, 141 and 142 are connected to terminals J, K, L, M, N, P and Q, respectively. The last-mentioned terminals are adapted to be connected to terminals having the same identification in the shape memory circuit 40 shown in Fig. 18.

Referring to Fig. 16, it will be seen that point C receives end of line pulses from the frequency divider 32, while terminal B receives end of frame pulses from sweep counter 33. Referring first to the pulses received at terminal C, these pulses are fed through capacitor 163 to both grids of a duo-triode 164. The input signal is fed across a resistor 165, the end of said resistor not connected to the grids being connected to a voltage divider 166. The voltage divider comprises series resistors 167 and 168, one end of the divider being connected to a negative potential and the other end being connected to ground. A bypass capacitor 169 is arranged in shunt with resistor 168.

The capacitor 163 and resistor 165 have the effect of differentiating the end of line pulses that are supplied, thereby providing a very sharp pulse which turns both sides of triode 164 into conduction. The plates of duo-triode 164 are connected together and through a parallel RC network to the control grid of a triode 170, said triode 170 being connected as a cathode follower. A high positive potential is connected to the plate of triode 170 and the cathode of said triode is connected through a fairly high resistor 171 to the common line connecting the plates of duo-triode 164. An RC charging network 172, which comprises a capacitor 173 and said resistor 171, are arranged in series. The arrangement is such that the cathode follower begins conducting from its high plate potential to the ground potential which is connected to the RC network 172, charging capacitor 173. The charge is very linear and charges from substantially ground potential to a peak potential, said peak potential occurring at the time that the end of line pulses are received at terminal C. That is, when the end of line pulse is applied to duo-triode 164, it turns said duo-triode on. The duo-triode offers very low resistance to the charge on capacitor 173 so that the capacitor is discharged through the tube to ground very rapidly. Therefore, there has been produced a sawtooth potential for every end of line pulse which is applied. These sawtooth potentials will be referred to as the rapid sawtooth potentials and are applied to the control grid of pentodes 175 and 176, and triode 191, across resistor 174. The last-named pentodes utilize a variable self-biasing network in order to adjust the amplification. The pentodes are also provided with the usual plate resistors which are connected to a positive source of potential. It will be noted that in addition tube 176 is provided with a screen grid resistor which connects directly to the positive plate supply.

The end of frame pulses received at terminal B are supplied to slow sawtooth generator 311. This generator is similar in operation to rapid sawtooth generator 310 except that the time constant is greater in order to furnish a longer duration sawtooth wave form. The slow sawtooth generator supplies its output to triode 182 and pentode 183.

The plate output is in the form of an inverted sawtooth and is supplied through a voltage divider network 185 to the control grid of a triode 186, the last-named triode being connected as a cathode follower. It will be noted that the screen grid of pentode 175 is connected to the plate of the triode 187, said plate being connected through a resistor to a high positive potential. The cathode of triode 187 is connected to ground and the control grid is supplied through a resistor 188 from terminal D. It will be remembered that terminal D receives this potential from the scan rotation circuit and that terminal D is relatively high during the idle horizontal, horizontal, second diagonal and first counter-diagonal scans. When terminal D is relatively high, tube 187 conducts, dropping the plate potential, and thereby dropping the screen grid potential of pentode 175. This has the effect of reducing the magnitude of the inverted sawtooth output from the pentode. Terminal D is relatively low during the remaining scans so that the pentode output is an inverted sawtooth potential of higher magnitude.

Pentode 176 provides an inverted sawtooth potential from the plate thereof which is always of the same magnitude after the amplification is adjusted. This potential is supplied through a voltage divider network 189 to the control grid of triode 190. This triode is connected as a cathode follower, having its plate connected to a high positive potential, and its cathode connected through a resistor to a negative potential.

Triode 191 has the usual plate resistor connected to a high positive source of potential. The cathode thereof is connected to a fixed self-biasing network. The output from triode 191 is an inverted sawtooth and is RC coupled to the control grid of triode 192. Triode 192 is connected in a manner similar to triode 191, except that it is furnished with a variable self-biasing network, and its output is coupled through a voltage divider network 193 to the control grid of the triode 194. Triode 194 is connected as a cathode follower and its output is a sawtooth potential of the same phase as that supplied to triode 191.

Triode 182, which receives the slow sawtooth potential from generator 311, is connected as an inverter and provides an inverted sawtooth potential as an output, said output being RC coupled to triode 195. Triode 195 is also connected as an inverter and its output potential is in phase with the potential supplied to triode 182. Triode 195 has a variable self-biasing network associated therewith. This sawtooth potential is supplied through voltage divider network 196 to the control grid of triode 197, the last-named triode being connected as a cathode follower.

Pentode 183 has its plate and screen grids connected through appropriate resistors to the usual power supplied and is furnished with a variable self-biasing network. The output from the pentode is in the form of an inverted sawtooth of the same frequency as the slow sawtooth, this output being coupled through the voltage divider network 198 to triode 199. The last-named triode is connected as a cathode follower and provides an inverted sawtooth potential similar to that supplied thereto.

The output potentials from cathode followers 186, 197, 190, 194 and 199 are combined with the potentials which are applied to terminals E, F, G and H, Fig. 16*b*. It will be remembered that the scan rotation control circuits shown in Figs. 15*a*, 15*b* and 15*c* provide the potentials at the last-named terminals. An explanation will be given of the manner in which the proper potentials are applied to the horizontal deflection plates H1 and H2, and the vertical deflection plates V1 and V2, to produce the various scanning patterns. Referring to Fig. 19, an "X" is used to indicate which of terminals D, E, F, G and H are positive during the various scanning patterns. It will be noted that the idle horizontal scan is identical to the horizontal scan. The system stays in the idle horizontal scan until registration occurs and then the horizontal scan is initiated.

During the horizontal scan terminals D and E are relatively positive. The fact that terminal D is positive causes the amplitude of the signal output from pentode 175 to be lower than when terminal D is relatively negative. This has the effect of lowering the amplification of the pentode so that the magnitude of the sawtooth output is decreased. With terminal E positive, leg 205 of "or" circuit 204 and leg 215 of "and" circuit 214 are at a similar potential. Terminal E is also connected to legs 221 and 231 of "or" circuits 223 and 230, respectively, thereby placing these legs at a similar potential. The sawtooth potential from cathode follower 186 is fed to leg 200 of "or" circuit 201 and passes therethrough to cathode follower 216, the output of which passes across positioning circuit 225 to horizontal deflection plate H2. Since the sawtooth potential rises sharply to a maximum at the beginning thereof, the electron beam will be attracted to deflection plate H2 at the beginning of the horizontal sweep. As the sawtooth potential gradually decreases the electron beam moves toward deflection plate H1. The level of potential to be applied to H1 is determined by the potential applied to terminal E. Since terminal E is relatively high in potential during the horizontal scan, this potential passes through "or" circuit 223, cathode follower 224, and diode 227, and controls H1. Horizontal positioning is the only function of this potential.

The vertical sweep control sawtooth is picked off cathode follower 199 and supplied to leg 213 of "and" circuit 214. Since terminal E is relatively high, this sawtooth potential passes through "and" circuit 214 to cathode follower 220. The output from the last-named cathode follower passes across positioning circuit 233 and is applied to vertical deflection plate V1. It will be noted that the reference level of positioning circuit 233 is controlled by a variable biasing network P15. The sawtooth at V1 rises sharply at the beginning thereof and positions the beam adjacent V1 at the beginning of the frame scan. The sawtooth gradually decreases to a minimum over the frame period so that at the end of the frame the beam is adjacent V2. The potential at E passes through leg 231 of "or" circuit 230 to cathode follower 232. The cathode follower output is connected across positioning circuit 233 to deflection plate V2.

It will be seen, from a reference to Fig. 2, that the voltages described above are correct for generating the horizontal scan.

Immediately after the end of the horizontal scan, terminals D and E drop in potential and terminal H rises in potential, thus initiating the first diagonal scan. Terminal H raises the potential of leg 212 of "and" circuit 211. The drop in potential at terminal D determines that the magnitude of the sawtooth from pentode 175 will be higher than when terminal D is high. This sawtooth, as before, is applied to H2 and prescribes that the horizontal component of electron beam motion be from right to left.

To make each successive sweep begin at a point which is a predetermined distance to the left of the preceding sweep, it is necessary to supply a sawtooth potential to H1 which begins at a minimum and increases to a maximum over the period of one frame. This sawtooth is obtained from cathode follower 197. The sawtooth passes through leg 203 of "or" circuit 204, cathode follower 217 and is applied across positioning circuit 226 to H1.

The vertical sweep sawtooth is picked off cathode follower 194 and passes through "and" circuit 211 by virtue of terminal H being relatively high. This sawtooth passes through cathode follower 219, "or" circuit 230 and cathode follower 232, and is applied to plate V2. The reference level of both V1 and V2 is positioned by circuit 233 as previously described.

At the end of the first diagonal sweep, terminal D rises in potential and causes the magnitude of the sawtooth applied to H2 to decrease. This is the only change necessary to go from the first diagonal scan to the second diagonal scan, as will be obvious from a reference to Figs. 3 and 4.

Upon completion of the second diagonal scan, only points F and H become positive. The positive potential at terminal F is connected to legs 222 and 202 of "or" circuits 223 and 201, respectively, thereby placing said legs at the same potential. Terminal H was positive during the second diagonal scan and remains in the same condition during the vertical scan. The positive potential at terminal F goes through "or" circuit 201 to cathode follower 216 in place of the sawtooth potential from cathode follower 186. Thus, only a reference level potential is fed to H2, this potential being supplied across positioning circuit 225. With terminal E relatively low, the slow sawtooth from cathode follower 197 can be supplied through leg 203 of "or" circuit 204 and cathode follower 217 to deflection plate H1. This assures that the electron beam will begin each successive scan to the left of the prior scan. That is, the scanning beam will move slowly from right to left.

With terminal H relatively positive the rapid sawtooth potential from cathode follower 194 passes through leg 210 of "and" circuit 211, cathode follower 219, leg 229 of "or" circuit 230, and cathode follower 232, to vertical deflection plate V2. This sawtooth causes the electron beam to travel rapidly from top to bottom.

Therefore, during the vertical scan the electron beam travels rapidly from top to bottom and slowly from right to left.

Upon completion of the vertical scan, terminals F and H drop in potential while terminals D and G rise in potential. As before, when terminal D rises in potential the amplitude of the rapid sawtooth potential which reaches cathode follower 186 is lowered. Terminal G is connected to leg 208 of "and" circuit 207, thereby permitting the rapid sawtooth potential from cathode follower 190 to pass through leg 206 of said "and" circuit. This rapid sawtooth potential passes through cathode follower 218, leg 228 of "or" circuit 230, and cathode follower 232 of deflection plate V2. Therefore, the beam travels rapidly from top to bottom of the cathode ray tube.

The slow sawtooth potential from cathode follower 197 passes through leg 203 of "and" circuit 204 and cathode follower 217 to horizontal deflection plate H1. This voltage assures that successive scans from top to bottom will be displaced to the left of the preceding scan.

To cause the beam to travel in a counter-diagonal path, the rapid sawtooth potential from cathode follower 186 passes through leg 200 of "or" circuit 201 and cathode follower 216 to deflection plate H2.

Upon completion of the first counter-diagonal scan only terminal D changes, i.e., it drops in potential. This has the effect of decreasing the slope of the path followed by the scanning beam. Thus, the second counter-diagonal scan is generated.

To this point the description has been primarily concerned with generation of the several scanning patterns for examining characters. The shape computing and memory circuits will now be described in detail, these circuits being shown in Figs. 17 and 18, respectively. Referring to Fig. 17, a four position binary counter is shown to include triggers 234, 235, 236 and 237. The plates of the right sides of the afore-mentioned triggers are connected through diodes 238, 239, 240 and 241, respectively, and an inverter 242 to terminal S. It will be remembered that terminal S receives positive end of line pulses from frequency divider 32. These pulses are inverted and fed through the diodes as reset pulses. Thus, during a line of scan the counter can add up to fifteen and is reset before the next line of scan begins. With the exception of trigger 237, the tapped point on the plate of the right side of one trigger is coupled to both control grids of the next trigger. Both control grids of trigger 234 are connected through inverter 243 and "and" circuit 244 to terminals A and R. It will be remembered that terminal A receives the raw video data from video amplifier 37 and that terminal R receives the sampling pulses from the multivibrator unit 31, there being sixteen sampling pulses for each line of scan. The "and" circuit 244 includes legs 245 and 246 which are connected to terminals A and R, respectively.

The four position binary counter described above operates in a conventional manner. The positive pulses in the form of video data are applied to terminal A. The coincidence of a sampling pulse at terminal R and positive video signals causes a positive pulse to pass to inverter 243, from which a negative pulse is supplied to trigger 234. The first negative pulse for a particular scan line turns trigger 234 "on." Succeeding negative pulses can cause the counter to count up to fifteen. It therefore becomes possible to pick off signals at certain points in the counter which will indicate any count up to and including fifteen. To do this, cathode followers 247, 248, 249 and 250 are connected to the plates of the right sides of triggers 234, 235, 236 and 237, respectively, while cathode followers 251, 252, 253 and 254 are connected to the plates of the left sides of triggers 234, 235, 236 and 237, respectively. Cathode followers 251, 247, 252, 248, 253, 249, 254 and 250 are connected so that their outputs are fed to hubs H1, H2, H3, H4, H5, H6, H7 and H8, respectively.

In the present embodiment, it has been chosen to utilize the outputs from H2, H6 and H8 only. This is due to the fact that an eight count, which is provided at H8, is to be termed a long count, and a five count, which may be obtained by a combination of the outputs at H2 and H6, is to be termed a short count. It should be apparent that these particular counts are chosen by way of example only. Other counts could be used, depending upon the size of the counter and the particular style of the character to be read. The hubs other than H2, H6 and H8, could be utilized for various counts other than those used in the present embodiment, if desired.

Referring to Fig. 8, it will be seen that one long count and one short count are obtained in scanning the character "A" during the horizontal scan. Therefore, a positive voltage is obtained at each of hubs H2 and H6 upon a five count, and at hub H8 upon an eight count. Referring to Figs. 17 and 18, it will be seen that hubs H2 and H6 are connected to hubs H28 and H27, respectively, and to hubs H14 and H13, respectively. Hub H8 is connected to both hubs H15 and H9.

Before entering into discussion concerning the manner in which the various long and short counts are treated, the memory circuit shown in Fig. 18 will be described. The memory circuit is in the form of a six by six thyratron matrix. That is to say, there are six horizontal rows of thyratrons with six thyratrons to each row. Thus, there are six vertical columns. The thyratrons are identified by reference numeral 255. While only a few of the thyratrons are so marked, it will be understood that they are all alike. A horizontal line is provided for each row of thyratrons and a vertical line is provided for each column of thyratrons. The thyratrons in each row have their control grids connected to the horizontal line associated therewith while the thyratrons of each column have their shield grids connected to the vertical line associated therewith. The plates of all thyratrons are connected to terminal Z which is adapted to be connected to a 125 volt power supply, Fig. 22. Each of the vertical lines aforementioned is connected to one of terminals K, L, M, N, P and Q. Each of the horizontal lines afore-mentioned is adapted to be connected to the output side of one of cathode followers 257, 259, 261, 263, 265 and 267. The operation of the matrix is such that when one of the vertical lines is raised in potential in coincidence with the raising in potential of one of the horizontal lines, the thyratron connected to both said lines conducts.

It will be remembered that terminals K, L, M, N, P and Q become relatively positive in potential during the horizontal, first diagonal, second diagonal, vertical, first counterdiagonal and second counterdiagonal scans, respectively. Cathode followers 257, 259 and 261 provide a positive output signal upon the occurrence of the first, second and third long counts, respectively, and cathode followers 263, 265 and 267 provide a positive output signal upon the occurrence of the first, second and third short counts, respectively, during a particular scanning frame. Therefore, during the horizontal scan, by way of example, the thyratron connected to terminal K and cathode follower 257 will begin conducting when the first long count signal is furnished, while the thyratron connected to terminal K and cathode follower 263 will begin conducting when the first short count signal is produced. The thyratrons which are turned on while the character is being scanned will stay on until the end of character.

Each thyratron has a relay coil associated therewith. As seen in Fig. 18, relays R1, R2, R3, R4, R5 and R6 are each associated with one of the thyratrons connected to terminal K. Relays R7, R8, R9, R10, R11 and R12 are each associated with one of the thyratrons connected to terminal L. Relays R13, R14, R15, R16, R17 and R18 are each associated with one of the thyratrons connected to terminal M. Relays R19, R20, R21, R22, R23, and R24 are each associated with one of the thyratrons connected to terminal N. Relays R25, R26, R27, R28, R29 and R30 are each associated with one of the thyratrons connected to terminal P, and relays R31, R32, R33, R34, R35 and R36 are each associated with one of the thyratrons connected to terminal Q. The contacts of the above-described relays are associated into the relay contact tree network shown in Fig. 22. This network will be explained in detail later in the description.

In order for the long and short count signals from the circuitry shown in Fig. 17 to get to the thyratron matrix of Fig. 18, a plurality of "and" circuits are furnished for entering into the horizontal lines of the matrix. Hubs H15, H16, H17 and H18 are connected to separate legs of "and" circuit 256 which leads to cathode follower 257. Hubs H19, H20, H21, and H22 are connected to separate legs of "and" circuit 258 which leads to cathode follower 259. Hubs H23, H24, H25 and H26 are connected to separate legs of "and" circuit 260 which leads to cathode follower 261. Hubs H27, H28, H29 and H30 are connected to separate legs of "and" circuit 262 which leads to cathode follower 263. Hubs H31, H32, H33 and H34 are connected to separate legs of "and" circuit 264 which leads to cathode follower 265 and hubs H35, H36, H37 and H38 are connected to separate legs of "and" circuit 266 which leads to cathode follower 267. Some of the afore-mentioned hubs are not used in the present embodiment due to the logic of using only counts of five and eight for identification purposes. Those hubs not used are floating so as not to disturb the operation of the remaining hubs on a particular "and" circuit.

A criteria will now be stated for determining which long and short counts computed in the four position counter of Fig. 17 will be used. The space between successive scans is such that possibly two or three scans may be made through the same straight line portion of a character. This would mean that on two or three successive scans it would be possible to get two or three short or long counts. It is unimportant, however, to know the number of closely spaced long or short counts, since one indication of such counts is sufficient for that portion of the character. Therefore, additional circuitry is provided to prevent entry into the matrix of additional long or short counts obtained on two or three successive line scans after a long or short count is received on one particular line.

The circuitry described above is shown in Fig. 17. This circuitry may be referred to as a short count counting circuit, illustrated generally by reference numeral 307, and a long count counting circuit, illustrated generally by reference numeral 308. Both circuits are identical and for this reason only the long count counting circuit will be explained in detail.

The first long count signal appearing at H8 was fed to H15 associated with the thyratron matrix shown in Fig. 18. This signal is also fed to H9 which connects to leg 269 of "and" circuit 268, said "and" circuit also including legs 270 and 271. Leg 270 is connected to H10 which is floating. Assuming for the moment that leg 271 is relatively positive, the positive long count signal supplied to leg 269 can pass through the "and" circuit to inverter 272. The negative going voltage from the plate of inverter 272 feeds to a delay circuit 274. The output voltage from the delay unit goes up, and then, after a predetermined time duration, drops. The drop in potential turns trigger 275 "on." The plate output of the left side of the last-named trigger drops in potential and feeds a negative potential through a cathode follower 280 to leg 271 of "and" circuit 268. Therefore, the "and" circuit locks out further long count signals for the moment.

When inverter 272 receives the first long count signal, a negative going voltage was fed to trigger 273 turning it "on." While the plate of the left side thereof goes down and feeds to a delay circuit 281, providing a positive going voltage through cathode follower 282 to leg 283 of "and" circuit 284, leg 285 of the "and" circuit is down since it is fed through cathode follower 286 from the plate of the right side of trigger 287 which is presently "off." Therefore, the first long count signal cannot get through "and" circuit 284 to cathode follower 288 and H12. This is desirable since an entry has already been made in the thyratron matrix to indicate a first long count.

As described above the long count counting circuit is now locked out. Since it is desirable that the circuit remain in this condition for only the next three lines of scan, a circuit is provided to unlock "and" circuit 268 after the next three succeeding lines of scan.

End of line positve pulses, which are received at point S, are fed to leg 279 of "and" circuit 278. Leg 277 of this "and" circuit is presently up since it is fed through cathode follower 276 from the plate of the right side of trigger 275 which is presently "on." Therefore, the first positive end of line pulse, representing the line upon which the first long count was received, can pass through the "and" circuit and inverter 289 to turn trigger 290 "on." The second end of line pulse turns trigger 290 "off" and trigger 291 "on." The third end of line pulse turns trigger 290 "on" again and the fourth end of line pulse turns triggers 290 and 291 "off." When trigger 291 goes "off" a negative going voltage is fed to delay circuit 292. The output voltage from delay 292 first rises and then after a predetermined time duration drops and turns trigger 275 "off." When this occurs, a negative going voltage is fed from the plate of the right side of trigger 275 to leg 277 of "and" circuit 278, thereby locking out said "and" circuit until a new long count signal is received. At the same time, trigger 275 also feeds a positive going voltage from the plate of the left side thereof through cathode follower 280 to leg 271 of "and" circuit 268, allowing the next long count to pass therethrough.

The next long count which occurs during the same frame of scanning passes through "and" circuit 268 and inverter 272 and turns trigger 273 "off" and trigger 287 "on." As before, the negative going output from the inverter locks "and" circuit 268 and unlocks "and" circuit 278. When trigger 273 is turned "off," a negative going voltage is fed from the plate of the right side thereof to delay circuit 293. The delay circuit output is a voltage which is going positive, thereby passing through cathode follower 294, H11, H19, "and" circuit 258 and cathode follower 259 to whichever thyratron is associated with the cathode follower output and the particular scanning pattern being generated. For example, during the horizontal scan, line K is up and therefore relay R2 would be energized. Therefore, a second long count has been entered into the memory thyratron matrix. Delay unit 281 is unresponsive to the positive going voltage from the plate of the left side of trigger 273.

After the next three succeeding lines of scan have been generated, the long count counting circuit is again responsive to a long count signal from H8. When this signal occurs, it turns trigger 273 "on." A negative going signal is fed from the plate of the left side of trigger 273 to delay 281, the output therefrom being in the form of a positive going signal which passes through cathode follower 282 to leg 283 of "and" circuit 284. Leg 285 of said "and" circuit is up since the plate of the right side of trigger 287 is also up. Thus, a positive signal passes through cathode follower 288, H12, H23, "and" circuit 260 and cathode follower 261 to fire one of the thyratrons whose control grid is associated with the cathode follower output. Thus, a third long count has been entered into storage.

The present apparatus has been designed such that at the end of a frame of scanning, a positive end of frame signal from point B is fed to inverter 300, the output from said inverter being in the form of a negative pulse appearing on line 301. A plurality of diodes 302, 303, 304, 305 and 306 are provided in the long count counting circuit, the cathodes of said diodes being connected to line 301, and the plates of said diodes being connected to the plates of the right sides of triggers 290, 291, 275, 287 and 273, respectively. The negative pulse on line 301 resets all of the aforementioned triggers to an "off" condition. Thus, the circuit is ready for the next frame of scanning.

As afore-mentioned, the short count counting circuit 307 receives its short count pulses through hubs H13 and H14 from hubs H6 and H2, respectively. The output signals from circuit 307 are fed to hubs H39 and H40, the last-named hubs being connected to hubs H31 and H35, respectively.

It should be understood that there will be a short count for each long count. Also, there may be short counts where there are no long counts. After three short counts have been entered into the matrix, however, any further short counts which occur do not affect the relays which have already been energized.

Those thyratrons and relays in the matrix shown in Fig. 18 which are cross-hatched are not required in identifying the letters A through Z of the type font from which Fig. 8 was prepared. For other type fonts, it is possible that some of the relays presently used may not be used and that some of the relays which are not used in the present embodiment may be used. It will be seen that a large number of possible combinations are built into the apparatus.

It has been shown how various combinations of relays R1 through R36 are energized during the scanning of the characters to be identified. Referring to Fig. 22, a relay contact tree network, illustrated generally by reference numeral 360, is shown. The tree network has been programmed in accordance with the particular type font from which Fig. 8 was prepared. The relay contacts are given reference numerals *a*, *b* or *c* with a prefix which designates the relay which operates that particular contact. For example, relay R1 operates the contact R1*a*. Since all of the relays shown in Fig. 18 are not used to identify the characters of this particular type font, the relay contacts associated with the unused relays are not found in the tree network. Certain relays which are operated for identifying the characters of this particular type font have only one contact associated therewith while others of the operated relays have two or three contacts. For example, relay R4 has contacts R4*a* and R4*b* while relay R13 has contacts R13*a*, R13*b* and R13*c*. It will be understood that when a particular relay is energized all of its associated contacts are transferred.

The output end of the tree network comprises a series of hubs. The designations for these hubs includes a first letter H for each hub, and a second letter which represents one of the letters of the alphabet A through Z. That is, if the letter A is scanned, the output signal indicating that fact will appear at hub HA.

The output signals at each of the hubs HA through HZ may be fed to a utilization device shown in block form in Fig. 1 and illustrated by the reference numeral 349. The utilization device may be any of a plurality of devices. For example, the input signals to 349 may control various types of record machines such as punches, sorters, typewriters, etc. The input signals may be fed to various electromagnetic devices for energizing them and causing some type of operation to be performed. The manner in which this could be accomplished is well known in the art. It is merely a matter of mechanical skill to arrange a particular desired device to be controlled by the input signals.

The read circuit for the relay tree network will now be described. Referring to Fig. 22, a thyratron 351 is provided, the plate thereof being connected through a relay contact R38*a* to a D.C. power supply which may be approximately +125 v. The plate is also connected to point Z which feeds to the plates of all the matrix thyratrons shown in Fig. 18. An RC network 352 is provided in shunt with contact R38*a* for purposes of arc suppression. The cathode of thyratron 351 is connected through relay R37 to ground potential.

When an end of character pulse appears at point T, the control grid of thyratron 351 goes up in potential and causes the tube to go into conduction. This causes relay R37 to operate which closes contact R37*a*. Therefore, the +125 v. power supply feeds through R37*a* to network 360. After a predetermined time delay, relay R38, having a capacitor 353 in shunt therewith, is energized to open contact R38*a*, thereby dropping out all of the thyratrons in the matrix shown in Fig.18, as well as thyratron 351. Capacitor 353, as well as the speed of operation of relay R38, controls the duration of the voltage supplied to the network. It is but necessary that the circuit being controlled by the network output be able to be operated before R38*a* opens. A diode 354 is furnished in shunt with relay R38 to eliminate inductive surge and any oscillations which result from the opening of contact R38*a*. Similarly, diodes may shunt the coils of relays R1 through R37 for the same purpose.

In the present invention the size of the individual characters which are expected to be identified may vary. Where a multi-pattern scanning arrangement is utilized it is desirable that the size of the scanning pattern bear an approximate relationship to the size of the character being scanned. A preferable relationship is one in which the ratio of the width to the height of the scanning field aperture is equal to the ratio of the width to the height of the character to be read. When this relationship is held, an eight count on a large character will cover the same portion of the character as an eight count on a small character. For example, suppose that the top horizontal bar of a large-sized letter "E" is scanned during the horizontal scan and an eight count is provided. If the relationship is kept, similar scanning of a small-sized letter "E" will also provide an eight count.

Maintaining the aspect ratio of the character equal to the aspect ratio of the raster is the feature upon which the simplicity and satisfactory operation of this system depends. Although, in actual length, horizontal, vertical and diagonal lines of a character are different, the pulse counts are approximately the same, if the equality of aspect ratios is maintained.

Where a document is to be read and the characters thereon are all the same size, it is possible to manually set the slow and rapid sawtooth magnitudes in advance. However, where the characters are of different sizes it becomes quite inefficient to manually adjust the magnitudes for the different size characters.

Thus, a circuit is provided which will automatically measure the character height and then adjust the sawtooth magnitudes so that a scanning pattern is generated which will provide the previously described relationship. Since the ratio of character height to width is nearly always identical, an adjustment of height and width of the scanning field, based on a measurement of the height of the character only, is sufficient to accomplish the desired result.

Referring to Fig. 20, a block diagram is shown of the modified deflection circuits. The rapid sawtooth generator 310 and the slow sawtooth generator 311 supply their voltages to a sawtooth magnitude control circuit, illustrated by reference numeral 312. The two sawtooth potentials are varied as a function of character size and then fed to the scanning pattern control circuits, illustrated by reference numeral 313.

Reference is now made to Fig. 21 which shows the details of the sawtooth magnitude control circuit 312. This circuit utilizes the idle horizontal scanning pattern for furnishing the proper information for setting the magnitudes of the slow and rapid sawtooth potentials. The size of this idle horizontal scanning pattern is initially set so that it is not too large for the smallest character expected to be encountered. As the character begins to enter the scanning field, the beam of light will intercept the outline of the character on a number of the lines of scan. The first time an interception occurs, during a particular line, a count is provided. For the first frame during which some portion of the character is intercepted, the total count for the frame is used to determine the sawtooth magnitude for the next frame. For example, if a large character is entering the field, the total count will most likely be twenty-four, the number of lines per frame. This large count increases the sawtooth magnitudes by a large amount. On the next frame of scanning, a new total count is provided. If a maximum count is again obtained, the sawtooth magnitudes are again increased by a large amount. This continues until the total count during a particular frame causes no increase in the sawtooth magnitudes. At this time the correct size scanning pattern is being generated. Upon registration of the character in the pattern, the remaining scanning patterns are generated, all in accordance with the size which was determined. The end of character pulse returns the idle horizontal pattern to its original minimum size. There follows a description of the sawtooth magnitude control circuit in greater detail.

The idle horizontal voltage, the video voltage, and the sampling pulses, which are received from points J, A and R, respectively, are fed to "and" circuit 314. It will be seen, by reference to Fig. 15*c*, that point J is relatively positive during the idle horizontal scan. The video data at point A and the sampling pulses at point R are relatively positive in polarity. When these three voltages occur simultaneously, a pulse is fed through the "and" circuit to inverter 315, the output of said inverter being in the form of a negative pulse which flips trigger 316 "on." The plate of the right side of trigger 316 feeds a positive going voltage through cathode follower 317 to "and" circuit 318, thereby gating said "and" circuit as long as trigger 316 is "on." The trigger is turned "off" by an end of line pulse. This pulse is received from point S and is in the form of a positive pulse which is fed to a delay circuit 319. The output voltage from the delay circuit is in the form of a positive going pulse, which, after a predetermined period of time, drops back to its original potential. During the positive going portion of the pulse the output is fed through cathode follower 320 to "and" circuit 318. In addition to the potentials received from cathode followers 317 and 320, "and" circuit 318 receives a potential from terminal "X." Referring to the registration circuit, Fig. 15*b*, terminal "X" will be positive if no video data is seen during the last sampling time for a line of scan. Therefore, "and" circuit 318 will pass a pulse to the control grid of pentode 321 if video data is seen in a line of scan during the idle horizontal scan, providing no video data is seen during the last sampling time for a line of scan. This assures that the last character which was scanned is out of the idle horizontal scan field before the size of the next scanning pattern is determined on the basis of the size of the next character. The negative going portion of the output from delay circuit 319 is fed to trigger 316 which turns the trigger "off."

With the above arrangement, it will be seen that as the character is moving into position to be scanned during the horizontal scan, one pulse is obtained for each line of scan which has intercepted a portion of the character. As previously mentioned, the pattern is relatively small during the initial scanning time. Each pulse which gets to pentode 321 is inverted and fed to inverter 322 to provide a positive pulse as the output therefrom. This positive pulse is fed to a staircase generator 323. This staircase generator includes a capacitor which is relatively large, illustrated by reference numeral 324. The plate of a diode 325 and the cathode of a diode 326 are connected to the output side of the capacitor while the cathode of the diode 325 is connected through a variable capacitor 327 to ground. The plate of diode 326 is connected directly to ground. Capacitor 327 is small relative to capacitor 324. Staircase generators such as the one illustrated and described are conventional. It will be understood that the amplitude of each step, for a particular amplitude input pulse, is controlled by the ratio of the size of capacitor 324 to the size of capacitor 327. Since capacitor 327 is variable the step amplitude can be varied accordingly. As a pulse comes from pentode 321, it builds up a charge on capacitor 327 which remains thereon until the next pulse comes through, thereby increasing the charge on the capacitor proportionally. Succeeding pulses come through and the charge gradually builds up on capacitor 327 in a step-wise fashion.

At the same time, the charge on capacitor 327 is supplied to a triode 328 which is connected as a cathode follower. The output from the cathode of triode 328 is fed to the cathode of a diode 329 which is one leg of an "and" circuit 331. Diode 330 of "and" circuit 331 is normally down in potential. However, the potential of the last-named diode is raised at the end of the frame in the following manner. An end of frame pulse, which is picked up at point B, is inverted in a triode 335. The output of said triode is a negative pulse which is fed through a voltage divider network 336 to triode 337. The output of triode 337 is in the form of a relatively positive voltage which is supplied to the cathode of diode 330. Thus, at the end of each frame, the highest potential which has been obtained on capacitor 327 in the staircase generator, is passed through "and" circuit 331 to the control grid of triode 332, the last-named triode having a capacitor 333 connected between the cathode and ground. A charge builds up on capacitor 333 proportional to the magnitude of the highest step of the staircase generator output. This voltage is fed from the capacitor to triode 340, which is connected as a cathode follower. The output from the last-named cathode follower is fed to the control grid of triode 342 through a current limiting resistor 341, the output from said triode being coupled through a divider 343 to a triode 344. The screen grid of pentode 321 is arranged to be controlled by the output potential from the last-named triode. It will be seen, therefore, that the amplification of pentode 321 is controlled by the magnitude of the highest step in the staircase generator output. Thus, the amplification becomes a function of the number of pulses which are received by the pentode during a frame of scan. Capacitor 333 is also connected to the plate of a triode 334 which is presently non-conducting. The cathode of triode 334 is connected to a pick-off on a resistor 361. A potential is applied across the resistor and a capacitor 362 is connected between the pick-off point and ground.

The end of frame pulse which was supplied from point B to triode 335 was a positive pulse. The output from triode 335 is in the form of a negative pulse which is fed through an RC differentiating network 338 to the control grid of a triode 339. The grid of the last-named triode is biased normally off and the plate thereof is connected to the high side of capacitor 327. When the leading edge of the negative pulse is applied to the differentiating network, the tube remains off. However, when the signal is differentiated, the trailing edge of the pulse becomes a positive signal and causes triode 339 to conduct, thereby discharging the voltage on capacitor 327. In this manner, staircase generator 323 is returned to its original condition at the end of each frame. However, it will be seen that the potential on capacitor 333, which is associated with triode 332, remains wherever it was set by the highest step of the staircase generator output potential.

It will be understood that a number of frames of scanning occurs during the idle horizontal scanning pattern before the character is in registration for being scanned with the remaining patterns. Therefore, as additional frames of scan during the idle horizontal scanning pattern occur, the potential on capacitor 333, which varies the amplification of pentode 321, will vary accordingly. For example, on the first scan where a portion of the character is intercepted, a number of pulses will be received, thereby setting a potential proportional thereto on capacitor 333. On the next scan the scanning pattern will have been increased in height, as a result of the increased amplitude sawtooth potentials generated as a result of the first frame of scan. The same or a smaller number of pulses may be received the next frame. When the number of pulses within a certain range is received on two successive scans the correct size of the scanning pattern is provided. The charge on capacitor 333 will remain until the end of the character pulse which is received from point T. It will be understood that this potential on capacitor 333 will be used to control the saw-tooth magnitude during the horizontal scans, the first and second diagonal scans, the vertical scan and the first and second counter diagonal scans. The end of character pulse, which is a positive pulse received at point T, is inverted in inverter 349 to become a negative pulse and is fed to inverter 350. The output from inverter 350 is in the form of a positive pulse which is fed to the control grid of triode 334 causing triode 334 to conduct. Therefore, it will be seen that capacitor 333 will be discharged to a potential which is controlled by the setting of the pick-off point on resistor 351. Capacitor 352 is relatively large and is used as a bypass capacitor to prevent shift in potential at the pick-off point.

Up to the present time it has been shown how a potential is generated which is a function of the character height. It will now be described how this potential is utilized to control the magnitude of the sawtooth potentials.

The sawtooth potential from the rapid sawtooth generator 310 is fed to the control grid of a triode 348, the output of which is RC coupled to the control grid of pentode 346. Since pentode 346 has its amplification controlled through the screen grid thereof by the potential from triode 344, which is a function of character size, the output from said pentode will be a sawtooth voltage which is a function of character size. This voltage is RC coupled to tubes 175, 176 and 191 in the scanning pattern control circuit 313. The sawtooth potential from the slow sawtooth generator 311 is fed to the control grid of a triode 347 the output of which is RC coupled to the control grid of pentode 345. Since the amplification of pentode 345 is controlled through its screen grid by the potential from triode 344, which is a function of character size, the output from the pentode is in the form of a sawtooth potential which is also a function of character size. This potential is RC coupled to tubes 182 and 183 in the scanning pattern control circuit 313.

While a somewhat detailed operation of Fig. 21 has already been given along with a description thereof, a brief resume will be made of the circuit operation for better understanding. As the character begins to move into the scanning pattern field, the scanning pattern which is being generated is a horizontal scanning pattern and the apparatus is in its idle condition. Video data will be received as soon as a portion of the character is intercepted by a line of scan. The coincidence of a sampling pulse and video data in the idle horizontal scan, during a particular line of scan, allows a signal to go through pentode 321 to a staircase generator 323. During a single frame of scan, a potential builds up in the staircase generator which is a function of the number of lines of scan during which a portion of the character is intercepted and the screen grid potential of pentode 321. As the character enters the field, the screen grid potential is a minimum.

A condition precedent to the operation outlined above is that the last character scanned must be out of the idle horizontal field of scan. This is assured by preventing any signals getting to pentode 321 as long as a video signal is received at the end of any line of scan during a frame. This is determined in the registration circuit.

The maximum potential reached during a frame of scan in the staircase generator is dumped into a capacitor 333 by an end of frame signal. The potential on capacitor 333 then controls the amplification of pentodes 321, 345 and 346. As previously mentioned, by controlling the amplification of pentode 321, the magnitude of each step of the staircase generator is controlled. The amplification control of pentodes 345 and 346 determines the magnitudes of the slow and rapid sawtooth potentials, respectively.

It will be seen that the scanning pattern generated on the next frame of scan will be of a new size. Also, each step in the staircase generator will have a larger magnitude. This will continue on subsequent frames until the number of pulses on succeeding frames remains substantially the same, thus establishing the scanning pattern size. The circuit parameters are established such that the correct scanning pattern size can be established before registration occurs.

Upon completion of the various scanning patterns, an end of character pulse at terminal T discharges capacitor 333 to a predetermined potential, thus returning the scanning pattern to its original size.

From the above detailed description, it will be apparent that a new and novel reading apparatus has been provided for reading graphic data and providing signals identifying the data. The apparatus is capable of identifying items of the data at a higher rate than that availble on readers of the prior art. A circuit is provided for determining when registration of the character occurs so that scanning with the differently oriented raster patterns may be commenced. This eliminates the requirement that the items be equally spaced apart.

A very important asset of this apparatus is the simplicity of the recognition circuit. This allows a relatively unskilled operator to set up a program for reading many different type fonts of characters. Plug hubs are provided which readily permit the proper circuit to be plugged into the apparatus. Additionally, the size of the raster patterns may be automatically controlled by the size of the character to be identified.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In reading apparatus, a sensing station including means for scanning characters to be read which are advanced past said station, the scanning means comprising means for scanning portions of a character in registration with said sensing station with a plurality of differently oriented scanning patterns, means comprising detecting means for producing signals when the scanning means senses portions of the character, said signals being of a duration proportional to the length of the portion sensed, and means for combining signals produced by scanning portions of at least one or more predetermined lengths for providing an output signal indicative of the character scanned at the completion of all of said scanning patterns.

2. In reading apparatus, a sensing station including means for scanning characters to be read which are advanced to said station, the scanning means comprising means for scanning portions of a character which is in registration with said sensing station with a plurality of differently oriented scanning patterns, detecting means for producing signals when the scanning means senses portions of the character, the signals produced during each scan being of a time duration proportional to the length of the portion sensed, means including length discriminator means responsive to said signals produced by sensing portions of at least one or more predetermined lengths during each pattern for providing length signals indicative of said predetermined lengths, circuit means responsive to the production of a length signal for a particular portion for preventing the production of a similar length signal for the same portion during a single scanning pattern, and memory means for storing the length signals produced during the different scanning patterns and providing an output signal indicative of the character scanned.

3. In reading apparatus, a sensing station including means for scanning characters to be read which are advanced to said station, the scanning means comprising means for scanning portions of a character which is in registration with said sensing station with a plurality of differently oriented scanning patterns, detecting means for producing signals when the scanning means senses portions of the character, the signals produced during each scan being of a time duration proportional to the length of the portion sensed, a pulse generator for producing a series of sampling pulses, coincidence means arranged to receive said sampling pulses and the signals produced by sensing portions of the character for providing a series of output pulses representative of the length of the portion sensed, circuit means including means for counting said pulses to determine if the number of pulses in a series is at least of one or more predetermined counts and providing signals indicative thereof, and means for combining the last-named signals in accordance with the scanning pattern in which they are produced for providing a signal indicative of the character scanned at the completion of all of said scanning patterns.

4. In reading apparatus, a sensing station including means for scanning characters to be read which are moved past said station, the scanning means comprising a cathode ray tube having pairs of horizontal and vertical deflection plates which control a scanning beam, deflection circuit means for supplying signals to said deflection plates for causing said scanning beam to follow a first-mentioned prescribed pattern at said sensing station, means comprising detecting means for producing signals when the beam senses portions of a character at said station, circuit means responsive to a predetermined sequence of signals produced during said pattern as a character is moving into said sensing station for providing a registration signal, a control circuit responsive to said registration signal for providing a plurality of sets of periodic control signals to said deflection circuit means to cause the last-named means to generate a plurality of scanning patterns including said first-mentioned pattern, each set of control signals causing said deflection circuit means to generate a scanning pattern which is angularly displaced relative to a previous scanning pattern, and means responsive to signals produced by said detecting means in sensing portions of a character of at least one or more predetermined lengths during each of said plurality of scanning patterns for producing a signal indicative of the character scanned at the completion of all of said scanning patterns.

5. In reading apparatus, a sensing station including means for scanning intelligence-bearing characters advanced past said sensing station, said scanning means including means for generating a plurality of differently oriented scanning patterns during a scanning cycle, each of said scanning patterns being angularly displaced relative to the other and each being adapted to successively scan portions of a character in registration with said station, means comprising detecting means for producing signals during each pattern when the scanning means senses portions of the character, said signals being of a duration proportional to the length of the portion sensed, discriminator means responsive to said signals of at least one or more predetermined durations for providing length signals indicative of said predetermined durations, and means for combining the length signals produced during each scanning pattern and deriving an output signal at the termination of said scanning cycle indicative of the character sensed.

6. In reading apparatus, a sensing station including means for scanning intelligence-bearing characters to be read which are advanced to said sensing station, the scanning means comprising means for scanning successive portions of a character in registration with said sensing station with a plurality of scanning patterns, each of said scanning patterns being angularly related to the other, means including detecting means for producing signals when the scanning means senses portions of the character, said signals being of a duration proportional to the length of the portion sensed, circuit means responsive to a sequence of signals produced during a predetermined one of said scanning patterns for providing a registration signal indicating that the character is in registration with said sensing station, means responsive to said registration signal for initiating the scanning of the character at said station with each of said plurality of angularly related scanning patterns, and means responsive to signals produced by scanning portions of at least one or more predetermined lengths during the last-named scanning patterns for providing an output signal indicative of the character scanned.

7. In reading apparatus, a sensing station, scanning means, generator means for causing said scanning means to make a plurality of successive sweeps to form a horizontal scanning pattern at said sensing station, means for advancing a character to be read to said sensing station so that there are times of registration and non-registration of said character with said horizontal scanning pattern, detector means for providing output signals when said scanning means senses portions of said character, registration circuit means connected to receive said output signals and effective upon the registration of said character with said scanning pattern for providing a registration signal, means responsive to said registration signal for causing said generator means to move said scanning means in a plurality of angularly related scanning patterns, and means responsive to the sensing of characteristic portions of a character during said plurality of scanning patterns for providing an output signal indicative of the character scanned.

8. In reading apparatus, a sensing station, scanning means, generator means for generating a plurality of frames of scan during each scanning cycle at said sensing station wherein said scanning means is caused to make a plurality of successive sweeps to form each frame, means for advancing a character to be read to said station so that as said character is entering the field scanned by said scanning means there are times of non-registration followed by times of registration therewith, means comprising detector means for providing output signals when said scanning means senses portions of said character, registration circuit means responsive to signals produced at any one of several predetermined times during one frame of scan followed by an absence of signals at said predetermined times during a following frame of scan for providing a registration signal, control means responsive to said registration signal for causing said generator means to move said scanning means in a predetermined manner, and means responsive to the sensing of characteristic portions of said character by said scanning means after registration occurs for producing an output signal at the termination of said scanning cycle indicative of the character scanned.

9. In reading apparatus, a sensing station, means for advancing characters to be read past said sensing station, scanning means, means for moving said scanning means in a predetermined pattern at said sensing station for a plurality of frames of scan, detector means for providing output signals when said scanning means senses portions of said character, registration circuit means comprising a first part which is effective during the time when said scanning means is at one end of a sweep and a second part which is effective during the time when said scanning means is at the other end of a sweep, the occurrence of a signal from said detector means to either of said first or second parts when they are effective providing a signal therefrom, and a third part responsive to a signal from said first part in conjunction with an absence of a signal from said second part followed by the absence of a signal from said first part for producing a registration signal.

10. In reading apparatus, a sensing station, means for advancing characters to be read past said sensing station, scanning means, means for moving said scanning means in a predetermined pattern at said sensing station for a plurality of angularly related frames of scan, detector means for providing output signals when said scanning means senses portions of said character, registration circuit means comprising a first part which is effective during the time when said scanning means is at one end of a sweep and a second part which is effective during the time when said scanning means is at the other end of a sweep, the occurrence of a signal from said detector means to either of said first or second parts when they are effective providing a signal therefrom, and a third part responsive to a signal from said first part in conjunction with an absence of a signal from said second part followed by the absence of a signal from said first part for producing a registration signal, control means responsive to said registration signal for causing said scanning means to move in a plurality of angularly related scanning patterns, and means responsive to the sensing of predetermined portions of said characters by said sensing means during said angularly related scanning patterns for producing an output signal indicative of the character scanned at the completion of all of said scanning patterns.

11. In reading apparatus, a sensing station, means for progressively advancing characters to be read to said sensing station so that there are times of registration and times of non-registration of said characters with said sensing station, means for progressively scanning a character during a time of non-registration with a scanning pattern of predetermined size and during times of registration with a plurality of angularly scanning patterns of determined sizes, means for producing signals upon the sensing of portions of said character by said scanning means, circuit means effective during said time of non-registration and responsive to certain of said signals for providing a character size signal, said scanning means being under the control of said character size signal for determining the size of the scanning pattern during times of registration of the character, and means responsive to signals from said detecting means during character registration for producing a signal indicative of the character.

12. In reading apparatus, scanning means, generator means for controlling said scanning means in a predetermined pattern in a manner to progressively scan a character to be read, detector means for providing output signals when said scanning means senses portions of said character, circuit means responsive to certain of said output signals for varying the size of said pattern as a function of the size of the character to be read, said generator means being effective following the establishment of the proper size of scanning pattern for generating a plurality of angularly related scanning patterns, means including said detecting means for producing signals when the scanning means senses portions of the character of at least one or more predetermined lengths, and circuit means responsive to the signal produced during each scanning pattern for providing an output signal indicative of the character scanned.

13. In reading apparatus, a sensing station, scanning means, generator means for generating a plurality of frames of scan at said sensing station wherein said scanning means is caused to make a plurality of sweeps so as to trace a predetermined pattern of a predetermined size to form each frame, detector means for providing an output signal for each sweep during a frame in which the scanning means senses a portion of a character entering said station, circuit means responsive to the output signals during each frame of scan for providing a character size signal, said generator means being responsive to said size signal for determining the size of the pattern to be generated during a following frame, circuit means responsive to a predetermined sequence of signals from said detector means on predetermined sweeps during a frame of scan for providing a registration signal indicative of a character being in registration at said sensing station, and means responsive to said registration signal for causing said generator means to move said scanning means in a plurality of angularly related scanning patterns of a size substantially the same as that being generated at the time of said registration signal.

14. In reading apparatus, a sensing station, scanning means, generator means for causing said scanning means to trace an idle scanning pattern at said sensing station, means for advancing characters to be read to said station, detector means for providing output signals when portions of a character entering said station are sensed by said scanning means during parts of said idle scanning pattern, character size determining circuit means responsive to the output signals during the generation of each idle scanning pattern for providing a size signal, said generator means being controlled by said size signal in a manner to adjust the size of a following scanning pattern in accordance therewith, means for producing a registration signal when a character is in registration with said sensing station, said generator means being responsive to said registration signal for causing said scanning means to scan said character with each of a plurality of angularly related scanning patterns, said detecting means producing signals during the last-named patterns when the scanning means senses portions of the character of at least one or more predetermined lengths, and logic circuit means responsive to the signals produced during each of said last-named scanning patterns for providing an output signal indicative of the character scanned.

15. In reading apparatus, means for scanning characters to be read having means for sensing the characters, means for progressively advancing the characters to be scanned, means for producing signals upon the sensing of predetermined characteristics of said characters by said scanning means, means responsive to said signals to provide an output signal indicative of the character read, and means effective during the scanning of said character and responsive to certain of the first-named signals for detecting the size of said character and controlling said scanning means in accordance therewith.

16. In reading apparatus, means for progressively scanning an intelligence-bearing character to be read with each of a plurality of angularly related scanning patterns, means comprising detecting means for producing signals when the scanning means senses portions of the character of at least one or more predetermined lengths, and logic circuit means responsive to the signals produced during each of said scanning patterns for providing an output signal indicative of the character scanned, said logic circuit means including means responsive to the production of a length signal for a particular portion for preventing the production of a similar length signal for the same portion during a single scanning pattern.

References Cited in the file of this patent

UNITED STATES PATENTS 2,616,983 Zworykin -------------- Nov. 4, 1952